US006737489B2

(12) United States Patent
Linert et al.

(10) Patent No.: US 6,737,489 B2
(45) Date of Patent: May 18, 2004

(54) POLYMERS CONTAINING PERFLUOROVINYL ETHERS AND APPLICATIONS FOR SUCH POLYMERS

(75) Inventors: Jeffrey G. Linert, Woodbury, MN (US); E. Steven McAlister, Woodbury, MN (US); Lian S. Tan, Woodbury, MN (US); Richard S. Buckanin, Woodbury, MN (US); Naiyong Jing, Woodbury, MN (US); Frans A. Audenaert, Kaprijke (BE); Thomas J. Blong, Woodbury, MN (US); John C. Clark, White Bear Lake, MN (US); Linda G. Coté, Woodbury, MN (US); Harald Kaspar, Burgkirchen (DE); Franz März, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/861,782

(22) Filed: May 21, 2001

(65) Prior Publication Data

US 2003/0139521 A1 Jul. 24, 2003

(51) Int. Cl.$^7$ .............................. C08F 114/18
(52) U.S. Cl. ..................... 526/242; 526/247; 524/502; 524/529; 524/543
(58) Field of Search .................. 526/242, 247; 524/502, 528, 543

(56) References Cited

U.S. PATENT DOCUMENTS

| | | | |
|---|---|---|---|
| 2,567,011 A | 9/1951 | Diesslin et al. | 260/465.7 |
| 2,732,398 A | 1/1956 | Brice et al. | 260/503 |
| 2,809,990 A | 10/1957 | Brown et al. | 260/534 |
| 3,136,745 A | 6/1964 | Albin et al. | 260/87.7 |
| 3,450,562 A | 6/1969 | Hoeschele et al. | 117/155 |
| 3,450,684 A | 6/1969 | Darby et al. | 260/87.5 |
| 3,635,926 A | 1/1972 | Gresham et al. | 260/87.5 A |
| 3,642,742 A | 2/1972 | Carlson et al. | 260/87.5 A |
| 3,755,242 A | 8/1973 | Reich | 260/37 N |
| 3,855,191 A | 12/1974 | Doughty, Jr. et al. | 260/87.5 A |
| 3,896,251 A | 7/1975 | Landucci | 428/290 |
| 4,024,178 A | 5/1977 | Landucci | 260/472 |
| 4,029,867 A | 6/1977 | Wasley et al. | 526/247 |
| 4,035,565 A | 7/1977 | Apotheker et al. | 526/248 |
| 4,215,205 A | 7/1980 | Landucci | 525/331 |
| 4,262,101 A | 4/1981 | Hartwimmer et al. | 526/89 |
| 4,368,308 A | 1/1983 | Yamabe et al. | 526/247 |
| 4,418,186 A | 11/1983 | Yamabe et al. | 526/247 |
| 4,439,385 A | 3/1984 | Kuhls et al. | 264/37 |
| 4,487,964 A | 12/1984 | Watson, Jr. et al. | 564/252 |
| 4,525,305 A * | 6/1985 | Patel | 554/91 |
| 4,546,157 A | 10/1985 | Nakagawa et al. | 526/247 |
| 4,587,301 A | 5/1986 | Watson, Jr. et al. | 525/123 |
| 4,588,796 A | 5/1986 | Wheland | 526/214 |
| 4,619,983 A | 10/1986 | Yamabe et al. | 526/247 |
| 4,654,394 A | 3/1987 | Yamabe et al. | 526/247 |

(List continued on next page.)

FOREIGN PATENT DOCUMENTS

| | | |
|---|---|---|
| CA | 2313886 | 1/2001 |
| DE | 1720799 | 5/1970 |
| DE | 19932771 | 7/1999 |
| EP | 194534 * | 9/1986 |
| EP | 0 194 534 | 9/1986 |
| EP | 0 186 186 | 7/1991 |
| EP | 0 219 065 | 3/1992 |
| EP | 0 524 585 | 7/1992 |
| EP | 0 566 974 | 4/1993 |
| EP | 0 632 009 | 5/1994 |
| EP | 0 649 863 | 10/1994 |
| EP | 0 731 081 | 9/1996 |
| EP | 0 964 009 | 12/1999 |
| EP | 969 055 | 1/2000 |
| EP | 969055 * | 1/2000 |
| JP | 1720799 | 5/1970 |
| JP | 46-11031 | 3/1971 |
| JP | 55-147433 | 4/1982 |
| WO | WO 93/22282 | 11/1993 |
| WO | WO 97/17381 | 5/1997 |
| WO | WO 99/62830 | 12/1999 |
| WO | WO 99/62858 | 12/1999 |
| WO | WO 00/52060 | 9/2000 |

OTHER PUBLICATIONS

3M Protective Material Division's "Stain Release Test I" method (Document # 98–0212–0725–7, available from 3M Co.), May, 1999.

3M Protective Material Division's "Laboratory Laundering Procedures" (Document # 98–0212–0703–4, available from 3M Co.), May, 1999.

Test Method 22–1996, published in the 2001 Technical Manual of the American Association of Textile Chemists and Colorists (AATCC).

Water Repellency Test II: Water/Alcohol Drop Test (Doc. # 98–0212–0721–6), May, 1999.

Blocked Isocyanates III.: Part. A, Mechanisms and Chemistry by Douglas Wicks and Zeno, W. Wicks Jr., Progress in Organic Coatings, 36 (1999), pp. 14–172.

*Primary Examiner*—David W. Wu
*Assistant Examiner*—Henry S Hu

(57) ABSTRACT

A fluorochemical composition for rendering a fibrous substrate oil and/or water repellent which comprises a solution or dispersion of a fluoropolymer having a partially or fully fluorinated backbone and comprising one or more repeating units corresponding to the general formula:

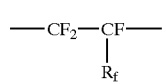

(I)

wherein $R_f$ represents a perfluorinated organic group having a chain length of at least 2 atoms and having at least one carbon atom and optional auxiliary components.

24 Claims, No Drawings

U.S. PATENT DOCUMENTS

| | | | | |
|---|---|---|---|---|
| 4,668,726 | A | 5/1987 | Howells | 524/225 |
| 4,670,328 | A * | 6/1987 | Kawachi et al. | 442/80 |
| 4,766,190 | A | 8/1988 | Morita et al. | 526/247 |
| 4,840,998 | A | 6/1989 | Shimizu et al. | 525/276 |
| 4,861,845 | A | 8/1989 | Slocum et al. | 526/68 |
| 4,929,471 | A | 5/1990 | Groelinger | 427/173 |
| 4,977,219 | A | 12/1990 | Watson, Jr. | 525/329.5 |
| 5,110,385 | A | 5/1992 | Birdwell et al. | 156/155 |
| 5,132,028 | A | 7/1992 | Nagase et al. | 252/8.6 |
| 5,219,910 | A | 6/1993 | Stahl et al. | 524/236 |
| 5,312,935 | A | 5/1994 | Mayer et al. | 554/182 |
| 5,453,477 | A | 9/1995 | Oxenrider et al. | 526/230 |
| 5,530,078 | A | 6/1996 | Felix et al. | 526/91 |
| 5,591,877 | A | 1/1997 | Obermeier et al. | 554/226 |
| 5,608,022 | A | 3/1997 | Nakayama et al. | 526/212 |
| 5,639,838 | A | 6/1997 | Albano et al. | 526/247 |
| 5,663,255 | A | 9/1997 | Anolick et al. | 526/254 |
| 5,817,249 | A | 10/1998 | Audenaert et al. | 525/8.61 |
| 5,882,466 | A * | 3/1999 | Grootaert et al. | 156/329 |
| 5,969,066 | A | 10/1999 | Enokida et al. | 526/247 |
| 5,981,614 | A * | 11/1999 | Adiletta | 521/145 |
| 5,990,330 | A | 11/1999 | Sulzbach et al. | 554/202 |

\* cited by examiner

POLYMERS CONTAINING PERFLUOROVINYL ETHERS AND APPLICATIONS FOR SUCH POLYMERS

FIELD OF THE INVENTION

The present invention relates to a fluorochemical composition for rendering fibrous substrates oil repellent, water repellent and/or stain repellent. In particular, the present invention relates to fluorochemical compositions that contain a fluoropolymer having a fluorinated backbone. The invention further relates to fibrous substrates, in particular textile, treated with the fluorochemical composition and to a method of treating the fibrous substrate with the fluorochemical composition. The invention also relates to the use of a fluorochemical composition comprising the fluoropolymer to render a fibrous substrate oil repellent, water repellent or soil repellent or to render soil or stain release properties thereto.

BACKGROUND

Compositions for making substrates, in particular fibrous substrates, such as textile, oil- and water repellent have been long known in the art. When treating fibrous substrates and in particular textile such as apparel, it is a requirement that the textile retains its look and feel as much as possible. Therefore, the amount of composition that can be applied in any treatment to provide repellency properties to the substrates is limited because large amounts would result in disturbing the look and feel of the substrate and would make them useless for many applications. As a result, the composition used for treating the substrates need to be effective at low application levels.

Fluorochemical compounds have been well known as being highly effective in providing oil and water repellency to substrates and in particular textile substrates. The commercially available fluorochemical compositions can be applied at low levels and are generally effective in providing the desired oil and water repellency properties at these low levels.

Commercially available fluorochemical compositions however have the disadvantage of being based on low molecular weight fluorochemical products or, if based on polymeric products, will generally contain residual low molecular weight fluorochemical compounds that may be present as contaminants from the manufacturing process and/or that may be formed over time from partial decomposition of compounds in the composition. From an environmental aspect, it would be desirable to eliminate such low molecular weight fluorochemical products from the fluorochemical treatment composition.

Fluorochemicals taught for treating textile include polymers based on vinyl ethers that have a perfluoroalkyl group. For example, U.S. Pat. No. 4,929,471 discloses the use of a copolymer of $CH_2=CH—OR$ wherein R may represent a fluorinated group for treating polyester fabric during its manufacturing process so as to produce a polyester fabric that has similar physical properties as silk or rayon.

U.S. Pat. No. 4,029,867 discloses to provide soil repellency and soil release properties to textile using a copolymer of maleic anhydride and a comonomer of the formula $CH_2=CH—CH_2—O— R_f$ wherein $R_f$ represents a perfluorinated group. A homopolymer of $CH_2=CH—O—R_f$ is disclosed in DE 1720799 and is mentioned to be suitable for rendering textile oil and water repellent. The aforementioned fluorochemical compositions are all based on fluorine containing polymers that do not have a fluorinated backbone.

Fluoropolymers having a fluorinated backbone such as for example polytetrafluoroethylene (PTFE) and copolymers of tetrafluoroethylene (TFE), have been known for coating substrates to provide various properties to the substrate including repellency properties. Fluoropolymers have for example been coated on cookware to provide desired release properties thereto. Fluoropolymers having a fluorinated backbone are disclosed in U.S. Pat. No. 4,546,157, U.S. Pat. No. 4,619,983, U.S. Pat. No. 4,766,190, U.S. Pat. No. 5,110,385, U.S. Pat. No. 5,969,066, U.S. Pat. No. 3,450,684, U.S. Pat. No. 4,035,565, U.S. Pat. No. 4,368,308, U.S. Pat. No. 4,418,186, U.S. Pat. No. 4,654,394, U.S. Pat. No. 4,840,998, U.S. Pat. No. 5,639,838 and U.S. Pat. No. 3,136,745. However, to be effective as a repellent coating, it has been taught to apply fluoropolymer coatings in high amounts. Such thick coatings are however unsuitable for treating textiles as they change the look and feel of the textile substrate substantially, i.e. to the extent such textiles are unsuitable for use in apparel. Sometimes, such coatings are subsequently subjected to a sintering step at high temperatures which would generally destroy many of the fibrous substrates desired for treatment.

EP 969 055 for example discloses an aqueous dispersion containing PTFE and a copolymer of TFE and a perfluorovinyl ether (PVE) for coating substrates such as ceramics or to impregnate textile. However, the amount of fluoropolymer in the treatment solution is at least 25% by weight resulting in a fairly thick coating. Moreover, the coating is subjected to a sintering step at a temperature of 420° C. which would destroy many fibrous materials used for apparel.

U.S. Pat. No. 4,670,328 discloses aqueous dispersions of certain copolymers of TFE and PVE for the impregnation of textiles. Again, the level of fluoropolymer applied in the impregnation is so large that the look and feel of the textile is substantially affected. Accordingly, the impregnated materials are generally only useful in specialized applications such as dust free clothes or chemical resistant clothes where the appearance of the clothes is of secondary consideration.

EP 186186 discloses a curable fluoroolefin polymer for making coatings that have high weatherability and good repellency properties such as water repellency, oil repellency and/or stain repellency. However, a thick coating is apparently required to achieve these properties.

It would thus be desirable to find alternative fluorochemical compositions that do not display many of the disadvantages of the fluorochemical compositions in the prior art. In particular, it would be desirable to find fluorochemical compositions that are effective in providing oil and water repellency to a fibrous substrate, in particular a textile substrate, without substantially adversely affecting the appearance of the textile, i.e. such that the fibrous substrate is suitable for use in apparel. Preferably, the fluorochemical compositions are also capable of providing soil repellency and soil release properties to the fibrous substrate. Desirably, the fluorochemical compositions will be more environmental friendly and are substantially free of low molecular weight fluorinated substances. The fluorochemical compositions are preferably sufficiently stable to substantially avoid formation of low molecular weight fluorinated substances. The fluorochemical compositions are preferably also compatible with commonly used textile treatments and are preferably easy to apply by a customer in a reproducible and reliable way. Finally, the desired fluorochemical compositions are preferably capable of providing durable repellency properties to a fibrous substrate.

SUMMARY OF THE INVENTION

In one aspect, the present invention provides a fluorochemical composition for rendering a fibrous substrate oil and/or water repellent. The fluorochemical composition comprises a solution or dispersion of a fluoropolymer having a partially or fully fluorinated backbone and comprising one or more repeating units corresponding to the general formula:

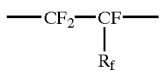

(I)

wherein $R_f$ represents a perfluorinated organic group having a chain length of at least 2 atoms and having at least one carbon atom. The amount of the fluoropolymer will typically be selected in order to achieve the desired level of fluoropolymer on the substrate to be treated. Typically the amount of the fluoropolymer in the fluorochemical composition is not more than 4% by weight (based on the total weight of the composition), for example between 0.01% by weight and 4% by weight, preferably between 0.05% and 3% by weight. Higher amounts of the fluoropolymer can be used as well, particularly in cases where the uptake of the composition by the fibrous substrate is low.

The fluorochemical composition of the present invention has been found to be effective for providing oil repellency and/or water repellency properties to a fibrous substrate without substantially affecting the appearance thereof. Furthermore, the fluorochemical composition can be produced such that the amount of low molecular weight (less than 1000 g/mol) in the composition is low, e.g. not more than 0.5% by weight, preferably not more than 1000 ppm, or is even free of such substances. Also, the compositions generally will have a high chemical stability such that the compositions generally do not form low molecular weight fluorinated substances over a long period of time. The fluorochemical composition may further provide soil repellency as well as soil or stain release properties. With the term soil and stain release is meant that a treated substrate that becomes soiled or stained can be more easily cleaned in for example a home laundering than an untreated substrate that becomes soiled or stained. Soil/stain repellency on the other hand refers to the ability to repel soil thereby reducing soiling or staining of the substrate.

In a further aspect, the present invention relates to a treatment of fibrous substrates with the above fluorochemical compositions. The substrates so obtained generally have good repellency properties such as oil repellency, water repellency, soil repellency. Additionally, the treated substrates may exhibit good or improved soil/stain release properties as well.

In a still further aspect of the present invention there are provided fibrous substrates, in particular textiles that have on at least part of at least one major surface, the fluoropolymer of the fluorochemical composition. The amount of the fluoropolymer on such a treated fibrous substrate should generally be less than 3% by weight based on the weight of the fibrous substrate so as to preserve the general look and feel of the substrate although the amount that can be applied without adversely affecting the look and feel of the substrate will depend on the nature of both the substrate as well as the fluorochemical composition used in the treatment.

In yet another aspect, the invention relates to the use of a fluorochemical composition to impart oil repellency, water repellency, soil repellency and/or soil/stain release to a fibrous substrate without substantially affecting the look and feel of said fibrous substrate, the fluorochemical composition comprising a solution or dispersion of a fluoropolymer having a partially or fully fluorinated backbone and comprising one or more repeating units corresponding to the general formula:

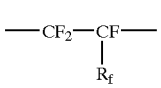

(I)

wherein $R_f$ represents a perfluorinated organic group having a chain length of at least 2 atoms and having at least one carbon atom.

By the term "without substantially affecting the look and feel of said fibrous substrate" is meant that the treated substrate does not differ substantially in appearance from the untreated substrate such that the treated substrate can be used without objection in applications such as for example apparel, where the look and feel of the fibrous substrate are a major consideration for its use.

In a still further aspect, the invention relates to a fluoropolymer mixture that comprises a first and a second fluoropolymer each having a partially or fully fluorinated backbone. The first fluoropolymer comprises one or more repeating units corresponding to the general formula:

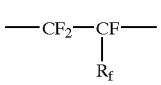

(I)

wherein $R_f$ represents a perfluorinated organic group having a chain length of at least 2 atoms and having at least one carbon atom. The one or more repeating units according to the general formula (I) are present in said first fluoropolymer in an amount of at least 20 mole %. The second fluoropolymer is free of repeating units according to general formula (I) or contains them in a total amount of not more than 18 mole %.

Such fluoropolymer mixture has been found to be particularly effective for the treatment of fibrous substrates. In particular it was found that the second fluoropolymer contributed to an improvement of the repellency properties often going beyond a mere addition of the oil repellency properties of the fluoropolymers on their own. Accordingly, the cost of a fluorochemical treatment composition may thereby be lowered as the cost of the first fluoropolymer is generally higher than that of the second fluoropolymer.

Finally, the invention relates to fluorochemical compositions that comprise a solution or dispersion of the aforementioned fluoropolymer and further an auxiliary component, generally a non-fluorinated organic compound, that is capable of further improving the water and/or oil repellency and/or the soil/stain release properties of a fibrous substrate treated with the fluorochemical composition.

DETAILED DESCRIPTION OF ILLUSTRATIVE EMBODIMENTS OF THE INVENTION

Fluoropolymers for use in the Fluorochemical Composition

The fluoropolymers for use in the fluorochemical composition are polymers that have a partially or fully fluorinated backbone, in particular a partially or fully fluorinated carbon backbone. Typically, the fluoropolymers of this invention will have a backbone that essentially consists of a carbon backbone. The term "fully fluorinated" includes polymers in which all hydrogen atoms on the backbone have been replaced by fluorine as well as polymers in which all hydrogen atoms on the backbone have been replaced with fluorine and chlorine or bromine. If the fluoropolymer has a partially fluorinated backbone, it will generally have a level of fluorination of at least 10% by weight, preferably at least 20% by weight, more preferably at least 30% by weight and most preferably at least 50% by weight.

The fluoropolymer has one or more repeating units that correspond to the general formula:

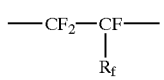 (I)

wherein $R_f$ represents a perfluorinated (i.e. all hydrogen atoms have been replaced by fluorine atoms) organic group having a chain length of at least 2 atoms and including at least one carbon atom. Preferably the chain length of the perfluorinated organic group is at least 3 atoms. A particularly preferred $R_f$ group has a chain length of at least 4 atoms of which at least 3 are carbon atoms.

Examples of $R_f$ groups include perfluorinated aliphatic groups that may optionally contain one or more oxygen atoms. The $R_f$ group may in particular be a linear or branched perfluoralkoxy group, preferably, the perfluoroalkoxy group will have between 1 and 6 carbon atoms and specific examples include methoxy, ethoxy and n-propoxy groups. The $R_f$ group may further be a linear or branched perfluoroalkyl group having between 2 and 8 carbon atoms including for example perfluoroethyl, perfluoropropyl and perfluorohexyl. Still further, the $R_f$ group can be a perfluoropolyether which may be linear or branched.

According to a preferred embodiment, the $R_f$ group corresponds to the following general formula:

$$—O(R^1_f O)_n(R^2_f O)_m R^3_f$$ (II)

wherein $R^1_f$, $R^2_f$ each independently represents a linear or branched perfluoroalkylene group having 1, 2, 3, 4, 5 or 6 carbon atoms, $R^3_f$ represents a linear, branched or cyclic perfluoroalkyl group having 1,2,3,4, 5 or 6 carbon atoms and n and m each independently represents an integer of 0 to 10. Preferably, at least one of n and m is different from 0. Particularly preferred $R_f$ groups according to formula (II) include those in which m is 0, n is 1, $R^1_f$ is $—CF_2CF_2—$, $—CF_2CF(CF_3)—$ or $—CF_2CF_2CF_2—$ and $R^3_f$ represents a linear, branched or cyclic perfluoroalkyl group having 1,2, 3,4, 5 or 6 carbon atoms, in particular a perfluoromethyl group and those in which both m and n are 0.

It will be understood by one skilled in the art that the fluoropolymer of the fluorochemical composition may comprise a mixture of repeating units according to formula (I). For example, the fluoropolymer may comprise a mixture of repeating units in which the $R_f$ groups correspond to formula (II) above such as for example a mixture of a repeating unit corresponding the formula:

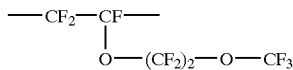

and a repeating unit corresponding to the formula:

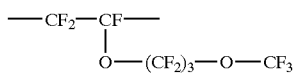

or a mixture of repeating units derived from a combination of perfluoro(propyl vinyl) ether and a monomer of the formula $CF_2=CF—O—CF_2CF(CF_3)—O—CF_2CF_2CF_3$.

The repellency properties that can be achieved by the fluorochemical composition largely depend on the presence in the fluoropolymer of the repeating units according to formula (I). The amount required of such repeating units however generally depends on the particular nature and structure of the repeating units according to formula (I). Typically, a level of at least 1 mole % of repeating units according to formula (I) may be necessary to achieve desirable oil and/or water repellency with the fluorochemical compositions. The repellency properties are generally improved by increasing the amount of repeating units of formula (I) and preferably the amount of repeating units of formula (I) is at least 5 mole %, more preferably at least 10 mole %, most preferably at least 15 mole %. Typical amounts of the repeating unit are in the range of 10 mole % to 80 mole %, for example between 30 mole % and 50 mole %. A fluoropolymer containing only repeating units according to general formula (I) may be used as well and has been found to yield excellent repellency properties on a fibrous substrate treated therewith. Although higher amounts of the repeating units of formula (I) will generally improve performance, the cost of the fluoropolymer thereby also increases as well because the monomers from which these repeating units are derived are generally expensive.

In a particular embodiment of the present invention, the fluorochemical composition comprises a fluoropolymer mixture comprising a first and second fluoropolymer each having a partially or fully fluorinated backbone. The first fluoropolymer comprises one or more repeating units corresponding to the general formula (I) set forth above. These one or more repeating units according to the general formula (I) are present in the first fluoropolymer in an amount of at least 20 mole %. The second fluoropolymer contains the repeating units of formula (I) in a total amount of not more than 18 mole %. The amount of repeating units in the second fluoropolymer may even be less, for example not more than 10 mole % or not more than 5 mole %. Further, even if less than 1 mole % or substantially no repeating units are present in the second polymer, beneficial effects of the second polymer have been noticed. In particular, it was noticed that although the second fluoropolymer generally does not (e.g. if it does not contain the repeating units of formula (I)) or only to a limited extent provides repellency properties when used on its own, the second fluoropolymer is nevertheless capable of improving the repellency performance when used in an admixture with the first fluoropolymer. It will be appreciated by one skilled in the art that the fluoropolymer may contain a mixture of more than two fluoropolymers, i.e. further fluoropolymers differing in content of repeating units may be comprised in the mixture.

Generally, any ratio of second to first fluoropolymer can be used in the mixture and the optimal ratio will depend on the nature of the fluoropolymers used in the mixture, the nature of the fibrous substrate, amount of the mixture applied and level of repellency desired. The optimal ratio can easily be determined through routine experimentation. Generally, the weight ratio of second to first fluoropolymer will be between 9:1 and 1:9, preferably between 8:2 and 1:1. Thus, mixtures that are rich (have a weight ratio of second to first fluoropolymer of 1 or more) in the second fluoropolymer, which contains no or little of the repeating units of formula (I), have been found to yield good repellency properties. Generally however, the total amount of repeating units according to the general formula (I) in such mixtures should be at least 1 mole %, preferably at least 5 mole % to achieve good levels of repellency.

The fluoropolymer mixture may be prepared by admixing a first and second fluoropolymer together in the desired ratios or can alternatively be prepared by allowing or providing for a composition drift during the polymerization of the fluorinated monomers. In the latter case, two or more fractions of fluoropolymer differing in their content of the repeating units according to formula (I) can be prepared. Fractions having a low content of repeating units according to formula (I) will generally be soluble in acetone whereas those rich in repeating units are generally insoluble in acetone.

An important benefit of the use of a fluoropolymer mixture is that the total cost of the treating composition can be reduced while still achieving a high level of performance.

The repeating units according to formula (I) above can be derived from the corresponding vinyl monomer having the general formula:

$$CF_2=CF-R_f \quad (III)$$

in which $R_f$ has the same meaning as defined above.

According to a particular embodiment, the fluorochemical composition comprises a copolymer of at least one fluorinated monomer, in particular fluorinated olefinic monomer, selected from the group consisting of tetrafluoroethylene, vinylidene fluoride and trichloroethylene and a monomer corresponding to formula (III) above. Generally, the fluoropolymer will contain between 0 and 70 mole %, preferably between 0 and 60 mole %, more preferably between 0 and 40 mole % of repeating units derived from tetrafluoroethylene, between 0 and 95 mole %, preferably between 20 and 80 mole %, more preferably between 30 and 75 mole % of repeating units derived from vinylidene fluoride whereby the total amount of repeating units derived from vinylidene fluoride and tetrafluoroethylene is generally between 0 and 95 mole %, preferably between 20 and 90 mole %, more preferably between 30 and 90 mole %.

The fluoropolymer of the fluorochemical composition may contain further repeating units derived from other fluorinated monomers and/or from non-fluorinated monomers. Examples of further fluorinated monomers include hexafluoropropylene and examples of non-fluorinated monomers include ethylene and propylene. The amount of such further repeating units may vary widely and can be from 0 mole % to 80 mole %. Preferably, the amount thereof is, when present, between 1 mole % and 50 mole %, more preferably between 5 mole % and 20 mole %.

In a further embodiment, the fluoropolymer may also be derived from monomers of formula (III) above and one or more non-fluorinated monomers such as ethylene and/or propylene.

Specific examples of fluoropolymers that can be used in the fluorochemical composition of this invention are copolymers of tetrafluoroethylene and a perfluorovinyl ether such as perfluoro(methyl vinyl) ether, perfluoro(methoxyethyl vinyl) ether, perfluoro (propyl vinyl) ether (PPVE-1), perfluoro (2-(n-propoxy)propyl vinyl) ether (PPVE-2) and perfluoro(ethoxyethyl vinyl) ether, copolymers of tetrafluoroethylene, hexafluoropropylene and a perfluorovinyl ether such perfluoro(methyl vinyl) ether, perfluoro (methoxyethyl vinyl) ether, PPVE-1, PPVE-2 and perfluoro (ethoxyethyl vinyl) ether, copolymers of vinylidene fluoride and a perfluorovinyl ether such as perfluoro(methyl vinyl) ether, PPVE-1, PPVE-2, perfluoro(methoxyethyl vinyl) ether and perfluoro(ethoxyethyl vinyl) ether, copolymers of vinylidene fluoride, tetrafluoroethylene and a perfluorovinyl ether such as perfluoro(methyl vinyl) ether, perfluoro (methoxyethyl vinyl) ether, PPVE-1, PPVE-2, and perfluoro (ethoxyethyl vinyl) ether, copolymers of vinylidene fluoride, hexafluoropropylene and a perfluorovinyl ether such as perfluoro(methyl vinyl) ether, PPVE-1, PPVE-2, perfluoro (methoxyethyl vinyl) ether and perfluoro(ethoxyethyl vinyl) ether and copolymers of vinylidene fluoride, tetrafluoroethylene, hexafluoropropylene and a perfluorovinyl ether such as perfluoro(methyl vinyl) ether, PPVE-1, PPVE-2, perfluoro(methoxyethyl vinyl) ether and perfluoro (ethoxyethyl vinyl) ether.

Method of Making the Fluoropolymers

Any of the methods known in the prior art for producing fluoropolymers as described above can be employed to produce the fluoropolymers of the fluorochemical composition. Such methods include suspension polymerization as disclosed in e.g. U.S. Pat. No. 3,855,191, U.S. Pat. No. 4,439,385 and EP 649863; aqueous emulsion polymerization as disclosed in e.g. U.S. Pat. No. 3,635,926 and U.S. Pat. No. 4,262,101; solution polymerization as disclosed in U.S. Pat. No. 3,642,742, U.S. Pat. No. 4,588,796 and U.S. Pat. No. 5,663,255; polymerization using supercritical $CO_2$ as disclosed in JP 46011031 and EP 964009 and polymerization in the gas phase as disclosed in U.S. Pat. No. 4,861,845.

Preferably, the fluoropolymer is produced through aqueous emulsion polymerization. In the aqueous emulsion polymerization, the monomers are polymerized in the aqueous phase generally in the presence of a free radical initiator and a fluorinated surfactant or emulsifier, preferably a non-telogenic emulsifier. The emulsifier will generally be used in amounts less than 1% by weight, for example from 0.1 to 1% by weight based on the weight of the aqueous phase. Examples of fluorinated emulsifiers include salts, in particular ammonium salts of linear or branched perfluoro alkyl containing carboxylic and sulphonic acids having 4 to 11 carbon atoms in the alkyl chain. It was found that salts of branched perfluoroalkyl containing carboxylic and sulphonic acids are more effective than their linear counter parts. Specific examples include perfluorooctanoic acid ammonium salt (APFO, described in U.S. Pat. No. 2,567,011) $C_8F_{17}SO_3Li$ which is commercially available from Bayer AG, $C_4F_9SO_3Li$ and $C_4F_9SO_3K$ (described in U.S. Pat. No. 2,732,398). A further example of a perfluoroalkyl containing carboxylic acid salt is $C_8F_{17}SO_2N(C_2H_5)CH_2COOK$ (described in U.S. Pat. No. 2,809,990).

Still further emulsifiers that can be used include perfluoropolyethercarboxylate emulsifiers such as disclosed in EP 219065. However, APFO is the preferred emulsifier as it can be more readily removed from the polymerization product at the end of polymerization.

Several methods are known to recover and recycle the fluorinated surfactants used in the aqueous emulsion polymerization. Such methods are disclosed in e.g. EP 524585, EP 566974, EP 632009, EP 731081, WO 99/62858, WO 99/62830 and DE 19932771. Any of these methods may advantageously be practiced in this invention to remove and or minimize any remaining fluorinated surfactant subsequent to the emulsion polymerization.

In accordance with an embodiment of the present invention, the emulsion polymerization may be conducted using a fluorinated surfactant having a molecular weight of at least 200 g/mol, preferably at least 1000 g/mol for example by using a polymeric fluorinated surfactant. Examples of suitable fluorinated polymeric or high molecular weight surfactants include perfluoropolyethers having one or more hydrophilic groups, in particular ionic groups such as carboxylic acid groups or salts thereof. Examples of perfluoropolyether surfactants include those according to the following formulas (IV) or (V):

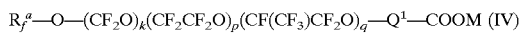

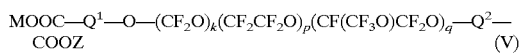

wherein k, p and q each represent a value of 0 to 15, typically 0 to 10 or 12 and the sum of k, p and q being such that the number average molecular weight is at least 200 g/mol, preferably at least 1000 g/mol, $R_f^a$ represents a perfluoroalkyl group of 2 to 4 carbon atoms, M and Z each independently represent hydrogen or a cation, preferably a monovalent cation such as ammonium or an alkali metal ion and $Q^1$ and $Q^2$ each independently represents —$CF_2$— or —$CF(CF_3)$—.

Examples of fluorinated surfactants of formula (IV) include those corresponding to the formula:

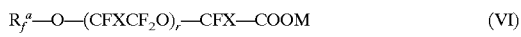

wherein $R_f^a$ and M have the meaning as defined in formula (IV), X is a hydrogen atom or a fluorine atom and r has a value of 2 to 15. Examples of such fluorinated surfactants are disclosed in EP 219065. Commercially available surfactants according to formula (IV) or (V) include FLUOROLINK™ C available from Ausimont SpA, KRYTOX™ 157 FSL, KRYTOX™ 157 FSM and KRYTOX™ 157 FSH, all available from Dupont de Nemours and Company.

Still further fluorinated polymeric surfactants that can be used include the perfluoropolymers that comprise repeating units derivable from a monomer of the formula:

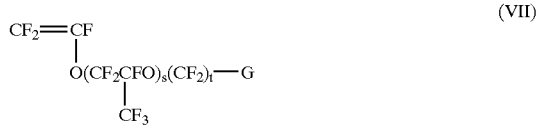

wherein s is 0, 1 or 2, and t is an integer of 2 to 4, and G is a moiety containing one or more hydrophilic groups, such as a nonionic, anionic or cationic group. Examples of suitable nonionic groups include: —$SO_2F$; hydroxyalkylene, e.g., —($CH_2$)$_n$OH where n is an integer of 1 to 18; hydroxyarylene; and an ester, e.g., —COOR, wherein R is an alkyl group of 1 to 3 carbon atoms. Examples of suitable anionic groups include: carboxyl groups, e.g., —$CO_2M$ where M may be hydrogen, a mono or divalent metal ion (e.g., sodium, potassium or magnesium), ammonium (e.g., simple ammonium, tetraalkylammonium, tetaarylammonium) or phosphonium (e.g., tetraalkylphosphonium); or sulfonate groups, e.g., —$SO_3M$, where M is defined as above. Examples of suitable cationic groups include alkylammonium groups, (e.g., —($CH_2$)$_n$$NR_3^+$ $Cl^-$ where R may be hydrogen, alkyl or aryl). Preferably, the fluorinated polymeric surfactant is a copolymer of tetrafluoroethylene and a monomer according to formula (VII). Such copolymers and their method of making are disclosed in for example U.S. Pat. No. 5,608,022 and WO 00/52060. Suitable fluorinated polymeric surfactants are available as Nafion™ superacid catalysts (e.g., Nafion™ IE10172) from E. I duPont de Nemours & Co., Wilmington, Del. and are also available as Flemion™ superacid polymers from Asahi Chemical Co., Osaka, Japan and as Acipex™ superacid polymers from Asahi Glass Co., Tokyo, Japan.

The aqueous emulsion polymerization can be carried out continuously in which, for example, monomers, water, optionally further emulsifiers, buffers and catalysts are fed continuously to a stirred reactor under optimum pressure and temperature conditions while the resulting emulsion or suspension is removed continuously. An alternative technique is batch or semibatch (semi-continuous) polymerization by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

For the free-radical polymerization use may be made of any suitable initiator or any suitable initiator system, for example ammonium persulfate (APS), or of redox systems, such as APS/bisulfite and potassium permanganate. If oil-soluble initiators are used in the polymerization, it is generally preferred for these to be mixed with the aqueous emulsion of the liquid fluorinated monomer. For the purposes of the present invention, oil-soluble initiators are those which have no, or only insufficient, solubility in water. Examples of oil-soluble initiators are substituted dibenzoyl peroxides and cumene hydroperoxides, in particular bisperfluoropropionyl peroxide.

The polymerization systems may comprise auxiliaries, such as buffers and, if desired, complex-formers or chain-transfer agents. The polymerization temperature may be from 10 to 180° C., typically 30° C. to 100° C. Polymerization pressures may be from 1 to 40 bar, typically 3 to 30 bar.

According to a particular embodiment for making the fluoropolymers, any liquid fluorinated monomer such as for example a liquid perfluorovinyl ether monomer used in the polymerization may be pre-emulsified prior to its copolymerization with the other gaseous monomers such as tetrafluoroethylene and vinylidene fluoride. The advantage of pre-emulsifying a liquid monomer is that it can be more readily incorporated into the fluoropolymer making the process more efficient and generally yielding better performing fluoropolymers, i.e. fluoropolymers that can yield higher repellency properties. By the term "liquid fluorinated monomer" is meant that the monomer is generally present as a liquid at ambient conditions of temperature and pressure, i.e. at a temperature of 20° C. and a pressure of 1 atm. By the term "pre-emulsified" in connection with the present invention is meant that the fluorinated monomer is emulsified in water with the aid of the fluorinated emulsifier prior to polymerization of the liquid fluorinated monomer.

The fluorinated liquid monomer can be emulsified in water with the aid of a fluorinated emulsifier such as described above, prior to its copolymerization with the other monomers. The pre-emulsification of the liquid fluorinated monomer results in an emulsion having monomer droplets. The pre-emulsion average droplet size can range from an average diameter of more than 1 μm, down to about 150 nm or even lower. Preferably the average droplet diameter is not more than 500 nm, more preferably not more than 300 nm. The aqueous emulsion should preferably have a pot life (settling time) of at least 1 hour, more preferably at least 3 hours. The pot life or settling time is defined as the time required for 10% by weight of the monomer droplets to settle or separate out of the aqueous emulsion.

Aqueous emulsions of the liquid fluorinated monomer can conveniently be obtained by suitable emulsification equipment such as for example high speed rotor-stator mixers such as an Ultra-Turrax (Ika). The stirring rates should be sufficiently high to achieve the desired degree of emulsification and stability. Generally, stirring rates of 24 000 rpm or more can be employed. Air is preferably excluded during the emulsification. The pre-emulsion particle size can be further reduced with high pressure homogenizers, available from APV Gaulin or Microfluidics.

The amount of fluorinated emulsifier used to emulsify liquid fluorinated monomer is generally between 0.01 and 10% by weight based on the weight of the liquid fluorinated monomer, preferably 0.1 to 4% by weight. Although higher amounts of emulsifier can be used, they will not necessarily lead to a significant increased pot life of the aqueous emulsion of liquid fluorinated monomer produced. Further, the use of high amounts of emulsifier is not preferred because the emulsifier generally needs to be removed after polymerization, making the process less effective.

Still further, the aqueous emulsion polymerization may be carried out without the addition of a fluorinated surfactant. In such case, the initiator or initiator system used will typically be selected such that sufficient ionic end groups are generated so as to stabilize the polymer particles in the aqueous emulsion polymerization. According to one way for carrying out an aqueous emulsion polymerization without the addition of fluorinated surfactant, a thermal initiator such as a persulfate, e.g. ammonium persulfate can be used to initiate the polymerization. The persulfate will typically generate sulphate end groups. By selecting the appropriate concentration of the persulfate and the temperature, a desired amount of radicals and polymerization particles can be generated. For example selecting a high initial initiator concentration will increase the number of radicals and particles formed. Likewise, by starting at a high temperature a larger number of radicals will be generated. Accordingly, the polymerization may be initiated at a first temperature and this temperature may then be lowered after an initial period of initiation. The initial period will typically be between 1 and 60 minutes, for example between 5 and 20 minutes from the start of the polymerization reaction. If desired, further initiator may be added during the polymerization but this may not be required. Amounts of initiator in the initial charge are generally between 0.01 and 2.0% by weight, preferably between 0.1 and 1.8% by weight, more preferably between 0.3% and 1.6% by weight based on the total weight of polymer to be produced. The temperature for use at the initial stage (when a higher temperature is used) is generally between 40° C. and 100° C., preferably between 60° C. and 90° C. The temperature during the course of polymerization is generally in the range of 30° C. to 80° C. The optimal conditions can be readily determined by routine experimentation.

Aqueous emulsion polymerization that is carried out without the addition of a fluorinated surfactant can further be practiced as disclosed in U.S. Pat. No. 5,453,477 and WO 97/17381. According to the emulsifier free aqueous emulsion polymerization disclosed in WO 97/17381 a radical initiator system of a reducing agent and oxidizing agent is used to initiate the polymerization and the initiator system is added in one or more further charges during the polymerization. The ionic end groups formed as a result of the initiator system used in WO 97/17381 are taught to stabilize the fluoropolymer particles in the emulsifier free aqueous emulsion process. Suitable oxidizing agents that can be used include persulfates such as potassium persulfate and ammonium persulfate, peroxides such as hydrogen peroxide, potassium peroxide, ammonium peroxide, tertiary butyl hydroperoxide, cumene peroxide and t-amyl hydroperoxide, manganese triacetate, potassium permanganate, ascorbic acid and mixtures thereof. Suitable reducing agents include sodium sulfites such as sodium bisulfite, sodium sulfite, sodium pyrosulfite, sodium-m-bisulfite, ammonium sulfite monohydrate and sodium thiosulphate, hydroxylamine, hydrazine, glucose, organic acids such as oxalic acid, malonic acid and citric acid and mixtures thereof.

The amount of oxidizing agent added in the initial charge is typically between 10 and 10000 ppm. The amount of reducing agent in the initial charge is typically also between 10 and 10000 ppm. At least one further charge of oxidizing agent and reducing agent is added to the polymerization system in the course of the polymerization. The further addition(s) may be done batchwise or the further addition may be continuous.

Fluorochemical Compositions

The fluorochemical composition comprises a dispersion or solution of the fluoropolymer in water or an organic solvent. Generally, the amount of fluoropolymer contained in the treating composition is between 0.01 and 4% by weight, preferably between 0.05 and 3% by weight based on the total weight of the fluorochemical composition. Higher amounts of fluoropolymer of more than 4% by weight, for example up to 10% by weight may be used as well, particularly if the uptake of the fluorochemical composition by the substrate is low. Generally, the fluorochemical treating composition will be prepared by diluting a more concentrated fluorochemical composition to the desired level of fluoropolymer in the treating composition. The concentrated fluorochemical composition can contain the fluoropolymer in an amount of up to 70% by weight, typically between 10% by weight and 50% by weight.

When the fluorochemical composition is in the form of a dispersion in water or an organic solvent, the weight average particle size of the fluoropolymer particles is preferably not more than 300 nm, more preferably is not more than 250 nm.

Most preferably, the fluorochemical composition is an aqueous dispersion of the fluoropolymer. Such dispersion may be non-ionic, anionic, cationic or zwitterionic. The dispersion is preferably stabilized using non-fluorinated surfactants, such as non-ionic polyoxyalkylene, in particular polyoxyethylene surfactants, anionic non-fluorinated surfactants, cationic non-fluorinated surfactants and zwitterionic non-fluorinated surfactants. Specific examples of non-fluorinated surfactants that can be used are nonionic types such as Emulsogen EPN 207 (Clariant) and Tween 80 (ICI), anionic types such as lauryl sulfate and sodium dodecyl benzene sulfonate, cationic types such as Arquad T-50 (Akzo), Ethoquad 18–25 (Akzo) or amphoteric types such as lauryl amineoxide and cocamido propyl betaine. The non-fluorinated surfactant is preferably present in an amount of about 1 to about 25 parts by weight, preferably about 2 to about 10 parts by weight, based on 100 parts by weight of the fluorochemical composition. Preferably the dispersion is free of fluorinated surfactants having a molecular weight of less than 1000 g/mol in particular less than 700 g/mol, or the amount thereof is kept to a minimum, for example not more than 0.5% by weight of the fluorochemical composition, preferably not more than 1000 ppm.

Alternatively, a solution or dispersion of the fluoropolymer in an organic solvent can be used as the fluorochemical treating composition. Suitable organic solvents include alcohols such as isopropanol, methoxy propanol and t-butanol, ketones such as isobutyl methyl ketone and methyl ethylketone, ethers such as isopropylether, esters such ethylacetate, butylacetate or methoxypropanol acetate or (partially) fluorinated solvents such as HCFC-141b, HFC-134a, HFE-7100, HFE-7200 or perfluoroketones.

The fluorochemical composition may contain further additives such as buffering agent, agents to impart fire proofing or antistatic properties, fungicidal agents, optical bleaching agents, sequestering agents, mineral salts and swelling agents to promote penetration. It is particularly preferred to include one or more auxiliary components other than the fluoropolymer and that are capable of further improving the oil- and/or water repellency properties of a fibrous substrate treated with the fluorochemical composition or that are capable of improving the soil/stain release properties of a fibrous substrate treated with the fluorochemical composition. Preferably, the auxiliary components are capable of improving the durability of the repellency properties and/or soil/stain release properties. The auxiliary components are generally non-fluorinated organic compounds and are also called extenders hereinafter. Suitable extenders capable of improving the oil- and/or water repellency properties include for example blocked isocyanates including aromatic and aliphatic blocked isocyanates, aliphatic polyisocyanates and aromatic or aliphatic carbodiimides including aromatic or aliphatic polycarbodiimides. Auxiliary components that are capable of enhancing the soil/stain release properties are generally non-fluorinated organic compounds such as for example blocked isocyanate compounds that include a polyoxyalkylene group, in particular a polyoxyethylene group. Auxiliary components that are generally capable of improving durability of the repellency properties or soil/stain release properties include non-fluorinated organic compounds that have one or more groups (or a precursor thereof) capable of reacting with the surface of the fibrous substrate. Examples thereof include compounds that have isocyanate groups or blocked isocyanates.

The aliphatic polyisocyanate for use as an extender in the fluorochemical composition is preferably a compound having a molecular weight of at least 350 g/mol and may be prepared by reacting a low molecular weight aliphatic polyisocyanate and organic compound having groups capable of reacting with an isocyanate. The amount of free isocyanate groups in the aliphatic isocyanate is typically at least 10% by weight of the total weight of the compound, preferably at least 20% by weight. Suitable low molecular weight aliphatic isocyanates include diisocyanates, triisocyanates and mixtures thereof. Examples include hexamethylenediisocyanate, 2,2,4-trimethyl-1,6-hexamethylenediisocyanate, and 1,2-ethylenediisocyanate, dicyclohexylmethane-4,4'-diisocyanate, aliphatic triisocyanates such as 1,3,6-hexamethylenetriisocyanate, cyclic trimer of hexamethylenediisocyanate and cyclic trimer of isophorone diisocyanate (isocyanurates).

The organic compound is generally reacted with the aliphatic polyisocyanate in the presence of a catalyst such as an organic tin compound and under reaction conditions commonly employed. The amount of organic compound will be selected such as to leave a desired amount of isocyanate groups unreacted. The resultant reaction mixture can be used in compositions of the invention. The organic compound preferably has one or two functional groups that are capable of reacting with an isocyanate group. Such functional groups include hydroxy, amino and thiol groups. Examples of organic compounds include alkane diols such as ethylene glycol, mono-alkanols having at least 6 carbon atoms, fatty ester diols, polyester diols, alkane diamines and dimer diols. According to a particularly preferred embodiment, the organic compound will include one or more water solubilising groups or groups capable of forming water solubilising groups so as to obtain a reaction product that is self-emulsifying in water. Suitable water solubilising groups include cationic, anionic and zwitter ionic groups as well as non-ionic water solubilising groups. Examples of ionic water solubilising groups include ammonium groups, phosphonium groups, sulfonium groups, carboxylates, sulfonates, phosphates, phosphonates or phosphinates. Examples of groups capable of forming a water solubilising group in water include groups that have the potential of being protonated in water such as amino groups, in particular tertiary amino groups. Particularly preferred organic compounds for reacting with the aliphatic polyisocyanate are those organic compounds that have only one or two functional groups capable of reacting with NCO-group and that further include a non-ionic water-solubilising group. Typical non-ionic water solubilising groups include polyoxyalkylene groups. Preferred polyoxyalkylene groups include those having 1 to 4 carbon atoms such as polyoxyethylene, polyoxypropylene, polyoxytetramethylene and copolymers thereof such as polymers having both oxyethylene and oxypropylene units. The polyoxyalkylene containing organic compound may include one or two functional groups such as hydroxy or amino groups. Examples of polyoxyalkylene containing compounds include alkyl ethers of polyglycols such as e.g. methyl or ethyl ether of polyethyleneglycol, hydroxy terminated methyl or ethyl ether of a random or block copolymer of ethyleneoxide and propyleneoxide, amino terminated methyl or ethyl ether of polyethyleneoxide, polyethylene glycol, polypropylene glycol, a hydroxy terminated copolymer (including a block copolymer) of ethyleneoxide and propylene oxide, a diamino terminated poly(alkylene oxide) such as Jeffamine™ ED, Jeffamine™ EDR-148 and poly (oxyalkylene) thiols.

Commercially available aliphatic polyisocyanates include Baygard™ VP SP 23012, Rucoguard™ EPF 1421 and Tubicoat™ Fix ICB.

A further suitable extender is a blocked isocyanate. By the term "blocked isocyanate" is meant a (poly)isocyanate of which the isocyanate groups have been reacted with a blocking agent. Isocyanate blocking agents are compounds that upon reaction with an isocyanate group yield a group that is unreactive at room temperature with compounds that at room temperature normally react with an isocyanate but which group at elevated temperature reacts with isocyanate reactive compounds. Generally, at elevated temperature the blocking group will be released from the blocked (poly) isocyanate compound thereby generating the isocyanate group again which can then react with an isocyanate reactive group. Blocking agents and their mechanisms have been described in detail in "Blocked isocyanates III: Part. A, Mechanisms and chemistry" by Douglas Wicks and Zeno W. Wicks Jr., Progress in Organic Coatings, 36 (1999), pp. 14–172.

The blocked isocyanate may be aromatic, aliphatic, cyclic or acyclic and is generally a blocked di- or triisocyanate or a mixture thereof and can be obtained by reacting an isocyanate with a blocking agent that has at least one functional group capable of reacting with an isocyanate group. Preferred blocked isocyanates are blocked polyisocyanates that at a temperature of less than 150° C. are capable of reacting with an isocyanate reactive group, preferably through deblocking of the blocking agent at elevated temperature. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Further suitable blocking agents include bisulfite and triazoles.

According to a particular embodiment of the invention, the blocked polyisocyanate may comprise the condensation product of a polyisocyanate, for example a di- or triisocyanate, a blocking agent and an organic compound other than the blocking agent and having one or more isocyanate reactive groups such as a hydroxy, amino or thiol group. Examples of such organic compounds include those described above. Particularly preferred are blocked polyisocyanates that have a self-emulsifying capability in water. Accordingly, to obtain such polyisocyanate compounds, a polyisocyanate, a blocking agent and an organic compound having a water solubilising group or a group capable of forming a water solubilising group in water, are reacted with each other under conditions commonly employed in reacting isocyanate components. Suitable organic compounds including such a water solubilising group or group potentially forming a water solubilising group have been described above.

Examples of polyisocyanates for preparing the blocked polyisocyanates include di- or triisocyanates as well as mixtures thereof. Specific examples are aromatic diisocyanates such as 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3 '-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate and aromatic tri-isocyanates such as polymethylenepolyphenylisocyanate.

Still further isocyanates that can be used for preparing a blocked isocyanate include alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; aliphatic triisocyanates such as 1,3,6-hexamethylenetriisocyanate; aromatic tri-isocyanates such as polymethylenepolyphenylisocyanate (PAPI); cyclic diisocyanates such as isophorone diisocyanate (IPDI) and dicyclohexylmethane-4,4'-diisocyanate. Also useful are isocyanates containing internal isocyanate-derived moieties such as biuret-containing tri-isocyanates such as that available from Bayer as DESMODUR™ N-100, isocyanurate-containing tri-isocyanates such as that available from Huls AG, Germany, as IPDI-1890, and azetedinedione-containing diisocyanates such as that available from Bayer as DESMODUR™ TT. Also, other di- or tri-isocyanates such as those available from Bayer as DESMODUR™ L and DESMODUR™ W, and tri-(4-isocyanatophenyl)-methane (available from Bayer as DESMODUR™ R) are suitable.

Commercially available blocked aromatic polyisocyanates include Baygard™ EDW available from Bayer Corp. and Hydrophobol™ XAN available from Ciba-Geigy.

A still further class of extenders suitable for use with the fluorochemical composition of this invention are carbodiimides. Suitable carbodiimides have been described in for example U.S. Pat. No. 4,668,726, U.S. Pat. No. 4,215,205, U.S. Pat. No. 4,024,178, U.S. Pat. No. 3,896,251, WO 93/22282, U.S. Pat. No. 5,132,028, U.S. Pat. No. 5,817,249, U.S. Pat. No. 4,977,219, U.S. Pat. No. 4,587,301, U.S. Pat. No. 4,487,964, U.S. Pat. No. 3,755,242 and U.S. Pat. No. 3,450,562. Particularly suitable carbodiimides for use in this invention include those corresponding to the formula (VIII):

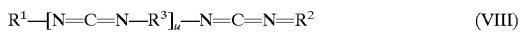

$$R^1-[N=C=N-R^3]_u-N=C=N=R^2 \qquad \text{(VIII)}$$

wherein u has a value of 1 to 10, typically 1 or 2, $R^1$ and $R^2$ each independently represent a hydrocarbon group, in particular a linear, branched or cyclic aliphatic group preferably having 6 to 18 carbon atoms and $R^3$ represents a divalent linear, branched or cyclic aliphatic group.

Yet a further class of extenders that can be advantageously used with the fluoropolymers in a fluorochemical treatment composition of this invention include polymers of acrylic and/or methacrylic monomers. Particular examples of such polymers include homo- and copolymers of alkyl esters of acrylic and methacrylic acid such as for example $C_1$ to $C_{30}$ alkyl esters of acrylic acid. Specific examples of such alkyl esters include methyl acrylate, ethyl acrylate, butyl acrylate, octadecyl acrylate and lauryl acrylate. Specific examples of suitable polymers include a homopolymer of methyl acrylate and a copolymer of methyl acrylate and octadecyl acrylate.

Method of Treatment of the Fibrous Substrates

In order to affect treatment of the fibrous substrate the fibrous substrate is contacted with the fluorochemical composition of the invention. For example, the substrate can be immersed in the fluorochemical treating composition. The treated substrate can then be run through a padder/roller to remove excess fluorochemical composition and dried. The treated substrate may be dried at room temperature by leaving it in air or may alternatively or additionally be subjected to a heat treatment, for example, in an oven. This heat treatment is typically carried out at temperatures between about 50° C. and about 190° C. depending on the particular system or application method used. In general, a temperature of about 120° C. to 170° C., in particular of about 150° C. to about 170° C. for a period of about 20 seconds to 10 minutes, preferably 3 to 5 minutes, is suitable. Alternatively, the chemical composition can be applied by spraying the composition on the fibrous substrate.

The amount of the treating composition applied to the fibrous substrate is chosen so that a sufficiently high level of the desired properties are imparted to the substrate surface without substantially affecting the look and feel of the treated substrate. Such amount is usually such that the resulting amount of the fluoropolymer on the treated fibrous substrate will be between 0.05% and 3% by weight based on the weight of the fibrous substrate. The amount which is sufficient to impart desired properties can be determined empirically and can be increased as necessary or desired.

Fibrous substrates that can be treated with the fluorochemical composition include in particular textile. The fibrous substrate may be based on synthetic fibers, e.g. polyester, polyamide and polyacrylate fibers or natural fibers, e.g. cellulose fibers as well as mixtures thereof. The fibrous substrate may be a woven as well as a non-woven substrate.

The invention will now be further illustrated with reference to the following examples without the intention to limit the invention thereto. All parts and percentages are by weight unless stated otherwise.

EXAMPLES

Formulation and Treatment Procedure

Treatment baths were formulated containing a defined amount of the fluoropolymer treatment agent with or without the addition of an additive. Treatments were applied to the test substrates by padding to provide a concentration as indicated in the examples (based on fabric weight and indicated as SOF (solids on fabric)). Samples were air dried at ambient temperature for 48 hours followed by conditioning at 21° C. and 50% relative humidity for 2 hours (air cure). Alternatively, the samples are dried and cured at a temperature and a time as indicated in the respective examples. Substrates used for the evaluation of treatments of this invention were commercially available and are listed below:

- 100% nylon US: PA microfiber
- 100% cotton US: ring spun (warp/weft) "Nexday Twill" style # 6393 Mercerized/dyed unfinished from Avondale mills in Graniteville S.C., USA
- 100% cotton US-2: ring/open end spun "Hippagator" style # 5401 Mercerized/dyed unfinished from Avondale Mills in Graniteville S.C., USA
- 100% cotton US-3: cotton available from Test Fabric, USA
- PES/CO: polyester/cotton 65/35 fabric, style no. 2681.4, available from Utexbel N.V., Ronse, Belgium
- PES/CO-2: polyester/cotton 65/35 fabric, style no. 05461, available from Avondale Mills, Graniteville S.C., USA
- 100% PA$\mu$: polyamide microfiber, style no. 7819.4, available from Sofinal, Belgium
- 100% cotton: bleached, mercerized cotton poplin, style no. 1511.1, available from Utexbel N.V., Ronse, Belgium
- 100% PES$\mu$: polyester microfiber, style no. 6145.3, available from Sofinal, Belgium
- PP SMS: polypropylene nonwoven fabric, medical grade, approximately 1–2 oz/yd$^2$ (35–70 g/m$^2$), spunbond/meltblown/spunbond laminate construction, available from Kimberly-Clark Corp., Neenah, Wisc.
- CEL/PES: cellulose/polyester nonwoven fabric, medical grade, approximately 1–2 oz/yd$^2$ (35–70 g/m$^2$), available from Precision Fabrics Group, Inc., Formed Fabrics Division, Greensboro, N.C.

After drying and optional heat cure, the substrates were tested for their repellency properties.

Respective data of water and oil repellency shown in the Examples and Comparative Examples were based on the following methods of measurement and evaluation criteria:

Spray Rating (SR)

The spray rating of a treated substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and was expressed in terms of a 'spray rating' of the tested substrate. The spray rating was obtained by spraying 250 ml water on the substrate from a height of 15 cm. The wetting pattern was visually rated against a standard rating chart: using a 0 to 100 scale, where 0 means complete wetting and 100 means no wetting at all.

Water Repellency Test (WR)

The water repellency (WR) of a substrate was measured using 3M Test Method, Water Repellency Test II: Water/Alcohol Drop Test (Doc. # 98-0212-0721-6), in which a series of water-isopropyl alcohol test liquids are used to determine a "WR" rating of the treated substrate. The WR rating corresponded to the most penetrating test liquid which did not penetrate or wet the substrate surface after 10 seconds exposure. Substrates which were penetrated by or were resistant only to 100% water (0% isopropyl alcohol), the least penetrating test liquid, were given a rating of 0, whereas substrates resistant to 100% isopropyl alcohol (0% water), the most penetrating test liquid, were given a rating of 10. Other intermediate ratings were determined by applying test liquids to a treated substrate consisting of varying percentage blends of isopropylalcohol and water and dividing the percent isopropyl alcohol in the test liquid by 10, e.g., a treated substrate resistant to a 70%/30% isopropyl alcohol/water blend, but not to an 80%/20% blend, would be given a rating of 7.

Oil Repellency (OR)

The oil repellency of a substrate was measured by the American Association of Textile Chemists and Colorists (AATCC) Standard Test Method No. 118-1997, which test was based on the resistance of a treated substrate to penetration by oils of varying surface tensions after contact for 30 seconds. Treated substrates resistant only to Kaydol® mineral oil (the least penetrating of the test oils) were given a rating of 1, whereas treated substrates resistant to n-heptane (the most penetrating, lowest surface tension test liquid) were given a rating of 8. Other intermediate values were determined by use of other pure oils or mixtures of oils, as shown in the following table.

| Standard Test Liquids | |
|---|---|
| AATCC Oil Repellency Rating Number | Compositions |
| 1 | Kaydol ® |
| 2 | Kaydol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Laundering Procedure

The procedure set forth below was used to prepare treated substrate samples designated in the examples below as "5 Home Launderings (5HL)"

A 230 g sample of generally square, 400 cm$^2$ to about 900 cm$^2$ sheets of treated substrate was placed in a washing machine along with a ballast sample (1.9 kg of 8 oz fabric in the form of generally square, hemmed 8100 cm$^2$ sheets). A commercial detergent ("Tide Ultra Powder", available from Proctor and Gamble, 35 g) was added and the washer was filled to high water level with hot water (41° C.+−2° C.). The substrate and ballast load were washed five times using a 12-minute normal wash cycle. The substrate and ballast were dried together in a conventional tumble drier at 65+−5° C. during 4+−5 minutes. Before testing, the substrates were conditioned at room temperature during about 4 hours.

10 HL (10 Home Launderings) or 20 HL (20 Home Launderings) indicated that the substrate was washed 10 times, respectively 20 times according to the procedure above.

Stain Release Test—Initial

This test evaluates the release of forced-in oil-based stains from treated fabric surface during simulated home laundering. Five drops of Stain K (mineral oil (Kaydol™) meeting the following specifications: kinematic viscosity of 64.9–69.7 centistokes at 40° C., specific gravity of 0.869–0.885 at 25° C.; available from Witco Chemical Co., Chicago, Ill.) are dropped onto the treated fabric surface in a single puddle. Also formed on the fabric is a separate puddle consisting of 5 drops of Stain E (Mazola™ corn oil, available from Bestfoods, Englewood Cliffs, N.J.). The puddles are each covered with glassine paper and weighted with a five-pound weight for 60 seconds. The weights and glassine paper are then removed from the fabric, the fabric is hung for 15–60 minutes, and then the fabric washed and dried. Samples are evaluated against a standardized rating board and are each assigned a number from 1 to 8. A rating of 8 represents total removal of the stain, whereas a rating of 1 represents a very dark stain. A more detailed description of this test procedure is written in the 3M Protective Material Division's "Stain Release Test I" method (Document # 98-0212-0725-7, available from 3M Co.).

Stain Release Test—After Launderings

The Stain Release Test was also run on treated fabric that had subsequently been washed using 5, 10, or 20, consecutive "home" launderings, followed by tumble drying, as described in the 3M Protective Material Division's "Laboratory Laundering Procedures" (Document # 98-0212-0703-4, available from 3M Co.).

Abbreviations

The following abbreviations and trade names were used in the Examples and Comparative Examples:
VDF: vinylidene fluoride ($CH_2=CF_2$)
TFE: tetrafluoroethylene ($CF_2=CF_2$)
HFP: hexafluoropropylene ($CF_2=CF(CF_3)$)
PMVE: perfluoro(methyl vinyl) ether ($CF_2=CF-O-CF_3$)
PPVE1: perfluoro(propyl vinyl) ether ($CF_2=CF-O-CF_2CF_2CF_3$)
PPVE2: $CF_2=CF-O-CF_2CF(CF_3)-O-CF_2CF_2CF_3$
Hydrophobol™ XAN: aqueous blocked aromatic polyisocyanate extender, available from Ciba Geigy
Tubicoat™ ICB: aliphatic isocyanate extender, available from CHT
Mondur™ MR Light: aromatic polyisocyanate, available from Bayer
Desmodur™ N-100: aliphatic polyisocyanate, available from Bayer
IPDI: isophorone diisocyanate, available form Merck
PAPI: Voronate™ M220: polymethylene polyphenyl isocyanate, available from Dow Chemical
MDI: 4,4'-methylene diphenyl diisocyanate, available from Bayer
Ethoquad™ 18/25: methyl polyoxyethylene(15)octadecyl ammonium chloride, available from Akzo
Arquad™ 12–50: dodecyl trimethyl ammonium chloride available from Akzo
EO: polyethyleneoxide, the number indicative of molecular weight
MPEG 750: poly(ethyleneglycol)monomethyl ether, with molecular weight 750, available from Aldrich
2-BO: 2-butanone oxime
ODI: octadecyl isocyanate
Isofol™ 18T: branched long chain alcohol (with average C18 chain) available from Condea
DBTDL: dibutyltin dilaurate
THV 220: copolymer of TFE/HFP/VDF (mole %: 42/20/38), commercially available from Dyneon
APFO: ammonium perfluorooctanoate
APS: ammonium persulphate
KPS: potassium persulphate
Nafion™ SE10172: fluorinated ionomer, available from DuPont de Nemours
FCK: $C_8F_{17}SO_2N(C_2H_5)CH_2COOK$
MIBK: methyl isobutyl ketone
MEK: methyl ethyl ketone
MgCl: magnesium chloride
Kaydol™: mineral oil available from Witco Chemical Corp., Greenwich, Conn.

All parts, ratios, percentages etc. in the following examples are by weight unless otherwise noted.

I. Synthesis of Fluorochemical Vinylether Polymers (FVEP)

Fluorochemical vinylether polymers (FVEP) and comparative fluorochemical polymers (C—FC) as given in table 1, were synthesised according to the procedures as given below. Table 1 further indicates the emulsifier used (if applicable) in the aqueous emulsion polymerization for producing the fluoropolymers.

TABLE 1

Composition of fluorochemical vinylether polymers

| FVEP | Emulsifier | Mole % (*) | | | | | |
|---|---|---|---|---|---|---|---|
| | | VDF | TFE | HFP | PMVE | PPVE1 | PPVE2 |
| 1 | APFO | 91.6 | 0.0 | 8.2 | 0.0 | 0.0 | 0.2 |
| 2 | APFO | 81.5 | 9.3 | 0.0 | 0.0 | 9.1 | 0.0 |
| 3** | APFO | 0.0 | 64.3 | 0.0 | 35.1 | 0.0 | 0.0 |
| 4 | APFO | 59.5 | 20.8 | 0.0 | 0.0 | 19.6 | 0.0 |
| 5 | APFO | 69.3 | 26.1 | 0.0 | 0.0 | 0.0 | 4.6 |
| 6 | APFO | 63.3 | 25.3 | 0.0 | 0.0 | 0.0 | 11.5 |
| 7 | APFO | 62.9 | 21.5 | 0.0 | 0.0 | 0.0 | 15.6 |
| 8 | APFO | 61.2 | 18.2 | 0.0 | 0.0 | 13.3 | 6.9 |
| 9 | APFO | 61.8 | 19.5 | 0.0 | 0.0 | 15.6 | 3.1 |
| 10 | APFO | 57 | 0 | 0 | 0 | 0 | 43 |
| 11 | APFO or Nafion SE10172 | 0 | 0 | 0 | 0 | 0 | 100 |
| 12 | Nafion SE10172 | 60 | 0 | 20 | 0 | 0 | 20 |
| 13 | Nafion SE10172 | 69.1 | 0 | 18.9 | 0 | 0 | 12 |
| 14 | Nafion SE10172 | 67.3 | 0 | 18.4 | 0 | 0 | 14.3 |
| 15 | Nafion SE10172 | 67.2 | 0 | 18.5 | 0 | 0 | 14.4 |
| 16 | Nafion SE10172 | 73.2 | 0 | 20 | 0 | 0 | 6.8 |
| 17 | APFO | 57.1 | 21.2 | 0 | 0 | 0 | 20.5 |
| 18 | / | 67.3 | 0 | 18.4 | 0 | 0 | 14.3 |
| 19 | / | 68.1 | 0 | 18.6 | 0 | 0 | 13.3 |
| 20 | Nafion SE10172 | 68.5 | 0 | 18.6 | 0 | 0 | 12.9 |
| 21 | Nafion SE10172 | 65.6 | 0 | 17.9 | 0 | 0 | 16.5 |
| 22 | Nafion SE10172 | 67.3 | 0 | 18.4 | 0 | 0 | 14.3 |
| 23 | Nafion SE10172 | 67.3 | 0 | 18.4 | 0 | 0 | 14.3 |
| 24 | APFO | 0 | 0 | 0 | 0 | 100 | 0 |
| C-FC1 | FCK | 52.4 | 22.5 | 25.0 | 0.0 | 0.0 | 0.0 |
| C-FC2 | FCK | 60.0 | 0.0 | 40.0 | 0.0 | 0.0 | 0.0 |

Notes:
*: samples FVEP-1 to FVEP-11 and C-FC1 and C-FC2: mole % of repeating units derived from the indicated monomers as measured by NMR analysis. samples FVEP-12 to FVEP-24: theoretic mole % of repeating units derived from the indicated monomers as calculated from monomer charges.
**: contains also 0.6% Bromotrifluoroethylene (BTFE)

Synthesis of FVEP-1 (VDF/HFP/PPVE2)

A polymerization vessel with a total volume of 186.1 l, equipped with an impeller agitator system, was charged with 114.6 l deionized water, 5 g sodium disulfite ($Na_2S_2O_5$) and 993 g of a 30% APFO solution. The vessel was degassed in three subsequent cycles and then charged with nitrogen to assure that all oxygen had been removed. The vessel was heated to 70° C. and the agitation system was set to 210 rpm. The vessel was charged with 55 g dimethylether ($Me_2O$), 400 PPVE-2 and 1140 g HFP so as to obtain a pressure of 3.50 bar absolute and with 2332 g VDF to obtain 15.5 bar absolute reaction pressure. The polymerization was initiated by the addition of 530 ml of a 30% solution of APS in water. As the reaction started, the reaction pressure of 15.5 bar absolute was maintained by feeding VDF and HFP into the gas phase with a feeding ratio of HFP (kg)/VDF (kg) of 0.203. Additionally, 600 g PPVE-2 were continuously added with a feeding rate of 220 g/h. The reaction temperature was kept at 70° C.

After feeding 48.76 kg VDF (265 min polymerisation time), the monomer feed was interrupted and the monomer valves were closed. Within 15 min, the monomer gas phase was reacted down to a vessel pressure of 6.3 bar; then the reactor was vented and flushed with $N_2$ in three cycles.

The so-obtained 173.1 kg polymer dispersion (solids content 34.6%, particle size of 151 nm, as measured with dynamic light scattering) was broached at the bottom of the reactor. A small amount of this dispersion was worked up to agglomerate according to the following procedure: 200 g of the dispersion was charged into a 1000 ml glass cylinder. 100 ml deionized water were added. Under vigorous stirring, 3 ml concentrated hydrochloric acid and 40 ml perfluoro n-heptane agglomeration aid (PF 5070 by 3M) were added. The mixture was stirred vigorously until the solid had fully separated from the aqueous phase. The agglomerate was washed three times with deionized water, the agglomeration aid was distilled off and the polymer was dried in an oven at 70° C. for 24 hours. The so-obtained polymer agglomerate showed a melting point maximum of 111° C. ° C. and a MFI(265/5) of 5.2 g/10. The polymer was evaluated by means of $^1H/^{19}F$ crosslink-NMR indicating a chemical composition of 91.6 mole % VDF, 8.2 mole % HFP and 0.2 mole % PPVE-2.

Synthesis of FVEP-3 (TFE/PMVE/BTFE)

A polymerization vessel with a total volume of 186.1 l, equipped with an impeller agitator system, was charged with 105 l deionized water, 200 g of a 25% aqueous ammonium solution and 1780 g of a 30% APFO solution in water. In three subsequent cycles, the vessel was degassed and subsequently charged with nitrogen to assure that all oxygen had been removed. The vessel was heated to 710° C. and the agitation system was set at 210 rpm. The vessel was charged with 19 g dichloromethane ($CH_2Cl_2$), 64 g bromotrifluoroethylene (BTFE), 7125 g PMVE and with 1927 g TFE to 16.0 bar absolute reaction pressure. The polymerization was initiated through the addition of 1763 g of a 20% solution of APS in water. As the reaction started, the reaction temperature of 71° C. as well as the reaction pressure of 16.0 bar absolute was maintained by the feeding TFE, PMVE and BTFE into the gas phase. A feeding ratio of PMVE (kg)/TFE (kg) of 1.044 and BTFE (kg)/TFE (kg) of 0.015 was used. After feeding 24.29 kg TFE (353 min polymerisation time), the monomer feed was interrupted and the monomer valves were closed. The reactor was vented and flushed with $N_2$ in three cycles. The so-obtained 158.3 kg polymer dispersion with a solids content 31.0% was broached at the bottom of the reactor. Latex particles having a diameter of 84 Nm, measured by dynamic light scattering, were obtained.

A small amount of this dispersion was worked up to raw gum by freeze coagulation over night, and subsequent defrosting and washing with demineralised water in three cycles. The raw gum was dried for 15 h at 130° C. under vacuum. The so-obtained polymer showed a Mooney viscosity ML 121° C. (1+10) of 68.9 and aMFI (220/5) of 14.1 g/10'. The polymer was evaluated by means of $1^9F$-NMR, indicating a chemical composition of 64.3 mole % TFE; 35.1 mole % PMVE and 0.6 mole % BTFE.

Synthesis of FVEP-17 (VDF/TFE/PPVE-2)

A polymerization vessel with a total volume of 47.5 l, equipped with an impeller agitator system, was charged with 22 l deionized water and 252 g 30% APFO solution. In three subsequent cycles, the vessel was degassed and subsequently charged with nitrogen to assure that all oxygen had been removed. The vessel was heated to 70° C. and the agitation system was set at 240 rpm. 4364 g PPVE-2 and 73.4 g 30% APFO solution were pre-dispersed into 5910 ml water, by means of an Ultraturrax agitator at 24.000 rpm for 5 min. This pre-emulsion was further pressurised three times under high shear in a M-110EH Micofluidizer Processor (Microfluidizer Corporation) under 1500 bar pressure. 2400 g of this pre-emulsion with a droplet size of 201 nm (according to dynamic light scattering) was charged into the reaction vessel (the rest of this pre-emulsion was used to be continuously fed into the reaction vessel within the polymerisation). The vessel was further charged with 10.5 g dimethylether, 197 g VDF to 3.86 bar and 192 g TFE to 6.0 bar absolute reaction pressure. The polymerization was initiated by adding 40 g APS dissolved in water. As the reaction started, the reaction temperature of 70° C. as well as the reaction pressure of 6.0 bar absolute was maintained by feeding TFE and VDF into the gas phase with a feeding ratio of VDF (kg)/TFE (kg) of 1.922. The rest of the PPVE-2 pre-emulsion was fed into the liquid phase with a feeding ratio of PPVE-2-pre-emulsion (kg)/TFE (kg) of 4.247. After feeding 770 kg TFE (77 min reaction time), the monomer feed was interrupted and the monomer valves were closed. Within 10 min, the monomer gas phase was reacted down to a vessel pressure of 2.1 bar; then the reactor was vented and flushed with $N_2$ in three cycles. The so-obtained 23.52 kg polymer dispersion with a solid content of 18.4% was broached at the bottom of the reactor. Latex particles having 234 nm in diameter (according to dynamic light scattering) were obtained. A small amount of this dispersion was worked up to raw gum by freeze coagulation over night, subsequent defrosting and washing with demineralised water in three cycles. The raw gum was dried for 15 h at 130° C. under vacuum. The so-obtained polymer showed a chemical composition of 20 mole % TFE, 60 mole % VDF and 20 mole % PPVE-2 as obtained by $^1H/^{19}F$ crosslink-NMR.

Synthesis of Fluorochemical Vinylether Polymers FVEP-2 and FVEP-4 to FVEP-9

In analogy to the synthesis for FVEP-17, the fluorochemical vinylether polymers FVEP-2 and FVEP-4 to FVEP-9, were prepared in polymerization vessels with a total volume of 7.2 l, equipped with an impeller agitator system. The polymerisation conditions as well as the chemicals used are summarized in the table below. The agitation was set to 320 rpm in all cases. The pre-emulsion of PPVE-2 used for the precharge was prepared by emulsifying 100 g PPVE-2 and 10 g 30% APFO solution into 550 ml water with an Ultraturrax agitator at 24.000 rpm for 5 min. The pre-emulsion of PPVE-2 used for the continuous feed was prepared by emulsifying 675 g PPVE-2 and 10 g 30% APFO solution into 680 ml water. In the cases 0.1% aqueous $KMnO_4$ solution was used as initiator, the amount of $KMnO_4$ solution was continuously fed into the reaction vessel at such rate that the feed was completed within the polymerisation time as given in the table below.

|  | FVEP-5 | FVEP-7 | FVEP-6 | FVEP-9 | FVEP-8 | FVEP-2 | FVEP-4 |
|---|---|---|---|---|---|---|---|
| Water [g] | 2000 | 1500 | 1400 | 1800 | 1800 | 2700 | 2700 |
| APFO [g] | 10 | 10 | 20 | 10 | 10 | 15 | 15 |
| T [° C.] | 25 | 60 | 40 | 50 | 50 | 70 | 60 |
| Reaction p [bar] | 9.0 | 6.0 | 6.0 | 9.0 | 9.0 | 9.0 | 9.0 |
| Initiator 0.1% $KMnO_4$ solution | 417 ml | — | 700 ml | — | — | — | — |
| Initiator APS | — | 3 g | — | 6 g | 6 g | 3 g | 3 g |
| Precharge amounts |  |  |  |  |  |  |  |
| TFE [g] | 61.4 | 37.4 | 40.9 | 51.8 | 52.3 | 15.9 | 42.6 |
| VDF [g] | 88.3 | 54.2 | 58.8 | 74.1 | 73.2 | 79.2 | 61.3 |
| PPVE-1 [g] | — | — | — | 244.3 | 248.1 | 79.6 | 202 |
| PPVE-2 [g] | 100 | 100 | 100 | 50 | 100 | — | — |
| Continuous feed of monomers |  |  |  |  |  |  |  |
| TFE [g] | 156 | 156 | 155 | 151 | 80 | 52.2 | 160 |
| VDF [g] | 299 | 299 | 299 | 290 | 329 | 305 | 308 |
| PPVE-1 [g] | — | — | — | 402 | 319 | 152.2 | 427 |
| PPVE-2 [g] | 675 | 675 | 675 | 170 | 340 | — | — |
| Obtained dispersion [g] | 4427 | 4055 | 4605 | 4085 | 4080 | 3350 | 3845 |
| % solids | 14.3 | 24.9 | 21.6 | 22.1 | 26.3 | 17.0 | 23.0 |
| Reaction time [min] | 291 | 224 | 354 | 164 | 292 | 84 | 326 |
| Chemical composition by $^1H/^{19}F$-NMR |  |  |  |  |  |  |  |
| TFE [mole %] | 23.1 | 21.5 | 25.3 | 19.5 | 18.2 | 9.3 | 20.8 |
| VDF [mole %] | 69.3 | 62.9 | 63.3 | 61.8 | 61.2 | 81.5 | 59.5 |
| PPVE-1 [mole %] | — | — | — | 15.6 | 13.3 | 9.1 | 19.6 |
| PPVE-2 [mole %] | 4.6 | 15.6 | 11.5 | 3.1 | 6.9 | — | — |

Synthesis of FVEP-10 (VDF/PPVE-2)

A polymerization vessel with a total volume of 47.5l, equipped with an impeller agitator system, was charged with 14 l deionized water. In three subsequent cycles, the vessel was degassed and subsequently charged with nitrogen to assure that all oxygen had been removed. The vessel was heated to 60° C. and the agitation system was set to 240 rpm. 4500 g PPVE-2 and 90 g APFO were pre-dispersed into 10.41 l water with stirring. This pre-emulsion was pressurised in a high pressure homogeniser (APV-Gaulin GmbH, Luebeck/Germany) to 300 bar and then expanded through slits. This pre-emulsion was charged into the reaction vessel. The vessel was further charged with 96 g VDF to 2.0 bar absolute reaction pressure. The polymerization was initiated through addition of 130 ml of a 30% solution of APS in water. As the reaction started, the reaction pressure of 2.0 bar absolute was maintained by feeding VDF for 3.5 hours. The reaction temperature was maintained at 60° C. After feeding 670 kg VDF, the monomer feed was interrupted and the VDF valve was closed. Then the reactor was vented and flushed with $N_2$ in three cycles. The so-obtained 34.2 kg polymer dispersion (solid content 15.4%) was broached at the bottom of the reactor. The polymer dispersion had latex particles with a diameter of 186 nm, as measured by dynamic light scattering. The polymer dispersion was worked up according to the procedure as described for FVEP-1. A highly viscous oil was obtained. The $^1H/^{19}F$ crosslink-NMR analysis indicated a chemical composition of 57 mole % VDF and 43 mole % PPVE-2.

Preparation of FVEP-11 (PPVE-2 Homopolymer).

20 g PPVE-2 was pre-emulsified with 4% (0.8 g) APFO or Nafion SE10172, as indicated in the examples below, and 46.6 g water using a Branson 450 sonifier to give a 30% pre-emulsion. After degassing and purging with nitrogen atmosphere, the pre-emulsion was charged into a polymerization bottle and polymerized with 1% APS in a pre-heated Launderometer at 65° C. for 5 hrs. Unreacted PPVE-2, remaining as a liquid at the bottom of the flask was separated from the upper latex. A translucent latex (99 nm) with 13% solids was obtained.

Synthesis FVEP-12 (VDF/HFP/PPVE2)

Fluorochemical vinylether polymer FVEP-12 was made using polymeric emulsifier, according to the following procedure:

A mixture of 280 g DI water, 1 g Nafion SE10172, 55.8 g PPVE2 and 1 g $KH_2PO_4$ was homogenized 3 times at 8800 psi using a 2-stage Gaulin 15MR high pressure homogenizer to yield a PPVE2 emulsion in water. 168.9 g of this emulsion was vacuum charged into a 500 ml autoclave, together with 0.1 g dimethyl malonate (DMM) and 5.5 g APS solution (0.5 g APS dissolved in 5 g water). 9.7 g HFP and 12.4 g VDF were then pressured into the reactor. The reaction ran for 16 hours at 71° C. A 12% solids, milky liquid, with a particle size of 151 nm was obtained.

Synthesis of FVEP-13 to FVEP-16 and FVEP-20 to FVEP-23

Fluorochemical vinylether polymers FVEP-13 to FVEP-16 and FVEP-20 to FVEP-23 were made using polymeric emulsifier, according to the following procedure for the synthesis of FVEP-13 (VDF/HFP/PPVE2:69.1/18.9/12):

A PPVE-2 emulsion, containing 140 g deionised water, 0.5 $KH_2PO_4$, 0.5 g Nafion SE10172 and 15 g PPVE2 was made according to the procedure described for FVEP-12.0.5 g APS and 0.1 g DMM were dissolved in 10 g deionised water. This mixture was added to the homogenized PPVE2 emulsion and vacuum charged into a high pressure reactor. The reactor was twice purged with nitrogen and evacuated. About 5 g of a 61/39 weight % mixture of VDF/HFP was charged into the reactor. The reaction mixture was heated to 71° C. during 30 min. Additionally 16 g VDF/HFP mixture were charged into the reactor manually, maintaining the reaction pressure near 150 psi. The reaction was held at 71° C. during additional 16 hours.

FVEP-14, FVEP-22 and FVEP-23 were made in the same way, but using a monomer ratio as indicated in table 1. FVEP-22 was made using KOH instead of $KH_2PO_4$ FVEP-23 was made with potassium phosphate monobasic instead of $KH_2PO_4$.

FVEP-15 and FVEP-16 were made in the same way, with monomer ratio's as given in table 1 and using a pressure regulator to add the gaseous monomers.

Synthesis of FVEP-20 (VDF/HFP/PPVE2)

1.5 g Nafion SE10172 and 1.5 g potassium hydrogenphosphate (buffer) were first dissolved in 480.0 g DI water. 45.0 g PPVE2 was added and the mixture was sonicated (using a Fisher Scientific 550 Sonic Dismembrator) for 60s to form a coarse emulsion. This coarse emulsion was further homogenized using a Gaulin 15MR for 3 passes at 8800 psi to form a fine emulsion. An initiator solution consisting of 20.0 g DI water, 1.0 g APS and 0.2 g dimethyl malonate was then added to 312.0 g of the homogenized emulsion and mixed using a magnetic stirrer. This mixture was vacuum charged into a 500 mL high pressure reactor, followed by twice purging with nitrogen and evacuation. When this was completed, the reactor temperature was heated to 71° C. while a 61%/39% VDF/HFP mixture was regulated into the reactor at 100 psi. A total of 34.2 g of the gas mixture was fed into the reactor. The entire reaction time took 16 hours after the reaction temperature reached 71° C. The resultant latex was 14.8% solids with a mean particle size of 71 nm.

Synthesis of FVEP-21

2.4 Nafion SE10172 and 1.2 g potassium phosphate monobasic (buffer) were first dissolved in 336.0 g DI water. 72.0 g PPVE2 was added and the mixture was sonicated for 60s to form a coarse emulsion. This coarse emulsion was further homogenized using a Gaulin 15MR for 3 passes at 8800 psi to form 411.6 g of a fine emulsion. An initiator solution consisting of 20.0 g DI water, 2.0 g APS and 0.4 g dimethyl malonate was added to 342.5 g of the homogenized emulsion. This mixture was vacuum charged into a 500 mL high pressure reactor, followed by twice purging with nitrogen and evacuation. When this was complete, a 61%/39% VDF/HFP mixture was regulated into the reactor until it reached 157 psi. At this point, the VDF/HFP gas feed was stopped, and the reactor agitation (800 rpm) and heating began. 90 minutes after the reactor was held at 71° C., additional VDF/HFP was regulated at 150 psi into the reactor. When a total of 68.4 g of gas was added (~75 hrs), the reactor was once again isolated at 71° C. for 2.5 hours. The resultant latex contained a small amount of coagulum. The latex after removing the coagulum had a mean size of about 242 nm and about 25% solids Synthesis of FVEP-18 and FVEP-19 (VDF/HFP/PPVE2) emulsifier free FVEP-18 and FVEP-19 were made without the addition of an emulsifier. Synthesis for FVEP-18:

72.0 g PPVE2 was added to 335.5 g DI water and sonicated for 60s to form a coarse emulsion. This coarse emulsion was further homogenized using a Gaulin 15MR high pressure homogenizer for 3 passes at 8800 psi to form an emulsion with an average droplet size of 247 nm. An initiator solution consisting of 20.0 g DI water and 1.03 g ammonium persulfate was added to 339.6 g of the homogenized emulsion (comprising 279.6 g DI water and 60 g PPVE2). This mixture was vacuum charged into a 500 mL high pressure reactor, followed by twice purging with nitrogen and evacuation. When this was complete, 10 g of a 61%/39% VDF/HFP mixture was regulated into the reactor. At this point, the VDF/HFP gas feed was stopped, and the reactor agitation (800 rpm) and heating began. 60 minutes after the reactor was held at 71° C., an additional 58.4 g of the VDF/HFP mixture was regulated at 150 psi into the reactor. When the gas feed was complete, the reactor was once again left at 71° C. for 2.5 hours. The resultant reaction mixture had two phases. The upper phase, a latex with a mean size of 412 nm (231 nm median) and 25.1% solids, was separated from the bottom clear phase (20 g), believed to be unreacted PPVE2.

Synthesis of FVEP-19

1.0 g potassium hydrogenphosphate and 30.0 g PPVE2 were added to 280.0 g DI water followed by sonication for 60s to form a coarse emulsion. This coarse emulsion was further homogenized using a Gaulin 15MR for 3 passes at 8800 psi. An initiator solution consisting of 10.0 g DI water, 0.1 g dimethyl malonate and 0.5 g ammonium persulfate was added to 156.0 g of the homogenized emulsion. This mixture was vacuum charged into a 500 mL high pressure reactor, followed by twice purging with nitrogen and evacuation. When this was complete, 5 g of a 61%/39% VDF/HFP mixture was pressured into the reactor. At this point, the VDF/HFP gas feed was stopped, and the reactor agitation (255 rpm) and heating (to 71° C.) began. 30 minutes after the reactor was held at 71° C., an additional 13.7 g of the VDF/HFP was regulated at 150 psi into the reactor. The entire reaction time took 16 hours, after the reaction temperature reached 71° C. The resultant material from the reaction had two phases—a latex with a mean size of 82 nm and a lower clear phase, believed to be unreacted PPVE2 monomer, that was removed from the upper latex.

Synthesis of FVEP-24 (PPVE1 Homopolymer)

60 g PPVE-1 was pre-emulsified with 6 g of a 30% aqueous APFO solution (3% APFO on PPVE-1) and 132.2 g water using a Branson 450 sonifier—while cooling with an ice-bath—to give a 30% pre-emulsion. The pre-emulsion was charged into a polymerization bottle and polymerized for 4 hrs in a pre-heated Launderometer at 70° C. after adding 6 g of a 10% APS-solution (1% on PPVE-1). Unreacted PPVE-1, remaining as a liquid at the bottom of the flask separated from the upper latex. A milky latex with 4% solids was obtained.

Synthesis of C-FC1 (VDF/TFE/HFP)

A polymerization vessel with a total volume of 186.1 l, equipped with an impeller agitator system, was charged with 114.6 l deionized water, 374 g potassium hydrogenphosphate ($K_2HPO_4$), 83 g diethylmalonate (DEM) and 262 g 10% FCK fluorosurfactant solution. In three subsequent cycles, the vessel was degassed and subsequently charged with nitrogen to assure that all oxygen had been removed. The vessel was then heated to 71° C. and the agitation system was set to 210 rpm. The vessel was further charged with 2245 g HFP, 712 g VDF and 712 g TFE to 10.0 bar absolute reaction pressure. The polymerization was initiated by the addition of 90 g APS dissolved in water. As the reaction started, the reaction temperature of 71° C. as well as the reaction pressure of 10.0 bar absolute was maintained by feeding TFE, VDF and HFP into the gas phase with a feeding ratio of TFE (kg)/VDF (kg) of 0.671 and HFP (kg)/VDF (kg) of 1.118. After feeding 14.86 kg VDF (245 min reaction time), the monomer feed was interrupted and the monomer valves were closed. Then the reactor was vented and flushed with $N_2$ in three cycles. The so-obtained 156.1 kg polymer dispersion with a solid content of 26.6% was broached at the bottom of the reactor.

A small amount of this dispersion was worked up to raw gum by freeze coagulation over night, subsequent defrosting and washing with demineralised water in three cycles. The raw gum was dried for 15 h at 130° C. under vacuum. The so-obtained polymer showed a chemical composition of 52.4 mole % VDF, 22.5 mole % TFE and 25 mole % HFP as obtained by $^1H/^{19}F$ crosslink-NMR.

Synthesis of C-FC2

A polymerization vessel with a total volume of 47.5 l, equipped with an impeller agitator system, was charged with 29 l deionized water, 71 g potassium hydrogenphosphate ($K_2HPO_4$), 6.4 g diethylmalonate (DEM) and 102 g 10% FCK solution. In three subsequent cycles, the vessel was degassed and subsequently charged with nitrogen to assure that all oxygen had been removed. The vessel was heated to 71° C. and the agitation system was set to 240 rpm. The vessel was further charged with HFP to 7.08 bar and with VDF to 12.0 bar absolute reaction pressure. The polymerization was initiated by the addition of 64 g potassium peroxodisulfate (KPS) dissolved in water. As the reaction started, the reaction temperature of 71° C. as well as the reaction pressure of 12.0 bar absolute were maintained by the feeding VDF and HFP into the gas phase with a feeding ratio of VDF (kg)/HFP (kg) of 0.640. After feeding 7.51 kg HFP (312 min reaction time), the monomer feed was interrupted and the monomer valves were closed. Then the reactor was vented and flushed with $N_2$ in three cycles. The so-obtained 41.1 kg polymer dispersion with a solid content of 29.4% was broached at the bottom of the reactor. A small amount of this dispersion was worked up to raw gum by freeze coagulation over night, subsequent defrosting and washing with demineralised water in three cycles. The raw gum was dried for 15 h at 130° C. under vacuum. The so-obtained polymer showed a chemical composition of 60 mole % VDF and 40 mole % HFP as obtained by $^1H/^{19}F$ crosslink-NMR. The polymer showed a Mooney viscosity (ML 1+10 @ 121° C.) of 53 and a solution viscosity in MEK of 54 ml/g.

2. Fractionation of Fluorochemical Vinylether Polymers

The composition of the fluorochemical vinylether polymers was evaluated by means of fractionation. Therefore, a sample was frozen by means of Dry Ice. The water was thawed and decanted from the broken emulsion. The sample was vacuum dried at 70° C., during 48 hours, until constant weight was obtained. The solids were dispersed in acetone at 5% by weight. The dispersion was centrifuged at 2000 rpm, during 40 min. This resulted in the separation of a soluble layer and discrete layers of insoluble material. The acetone soluble top layer (indicated as 'soluble') was removed and put into a pre weighed container. The following layer (indicated as 'insoluble') was removed and put into a pre weighed container. Occasionally, a third layer remained at the bottom of the recipient (indicated as 'bottom'). The composition of the different layers was determined by $^1H/^{19}F$-NMR. The mole percentages are given in the table below.

| Sample | Weight % fraction | Mole % VDF | TFE | PPVE-1 | PPVE-2 |
|---|---|---|---|---|---|
| FVEP-7 (soluble) | 83 | 64 | 21.9 | / | 14.1 |
| FVEP-7 (insoluble) | 3 | 43.2 | 10.7 | / | 46.1 |
| FVEP-9 (soluble) | 44 | 62.5 | 21.8 | 12.7 | 3.0 |
| FVEP-9 (insoluble) | 23 | 60.2 | 14.3 | 22.8 | 2.7 |
| FVEP-9 (bottom) | 21 | 37.9 | 5.5 | 49.3 | 7.3 |

Note:
all fractions were soluble in hexafluorometaxylene

3. Application of Fluorochemical Vinylether Polymers

The fluorochemical vinylether polymers could be applied to substrates as an aqueous emulsion or in an alternative way, the fluorochemical vinylether polymers could be applied out of solvent.

a. Aqueous Anionic Emulsion

The fluorochemical vinylether polymers could be applied as aqueous anionic emulsions as prepared above.

b. Aqueous Cationic Emulsion

In an alternative way, the fluorochemical vinylether polymer dispersions obtained after preparation of the polymer were first coagulated using MgCl or freeze dried. In a second step, the solids were dissolved or dispersed in an organic solvent, such as ethyl acetate or MEK. A cationic emulsion was obtained using the following method: to 60 g of fluorochemical vinylether polymer solution in solvent, e.g., ethyl acetate, were added a solution of emulsifier (kind and amount given in the examples) in water. The mixture was heated to 65° C. and added to 96 g deionized water, preheated to 65° C., whilst stirring. The so formed pre-emulsion was then emulsified by immersion of an ultrasound probe (Branson 450-D Sonifier) for 6 minutes (cycle 10" run—5" stop at 50–60° C.). The solvent, e.g., ethyl acetate, was distilled off with a rotary evaporator at 55°, using waterjet vacuum. Stable milky emulsions of about 20% solids were obtained.

c. Solvent Mixture

To obtain a treatment solution of the fluorochemical vinylether polymer in solvent, the obtained fluoropolymer dispersions were coagulated using MgCl or freeze dried and in a second step, the solids were dissolved or dispersed in an organic solvent, such as ethyl acetate or MEK.

4. Synthesis of Hydrocarbon Extenders

Several hydrocarbon extenders, as given in table 2, were synthesised according to various methods, depending on their structure:

A Synthesis of Blocked Isocyanates a. Self Emulsifiable Blocked Isocyanate Ext-I A reaction flask, equipped with a reflux condenser, a mechanical teflon blade stirrer, a thermometer, a nitrogen inlet and vacuo outlet, was charged with 132 g Mondur MR Light, 155 g ethyl acetate and 23 g MPEG 750. 400 mg DBTDL were added and the mixture was heated to reflux and allowed to react for 1.5 hours. 65 g 2-BO, dissolved in 56 g ethyl acetate were added and the reaction mixture was allowed to reflux for one hour and was then cooled and stored in a glass jar.

b. PAPI/Glycerolmonostearate/2-BO (Ext-2)

A reaction flask, equipped with a reflux condenser, a mechanical teflon blade stirrer, a thermometer, a nitrogen inlet and vacuo outlet, was charged with 60.75 g PAPI, 35.8 g glycerolmonostearate and 177.5 g ethyl acetate. After addition of 2 drops DBTDL, the mixture was stirred at 70° C. during 7 hours. In a second step, 21.75 g 2-BO was added and the reaction continued at 50° C., until FTIR analysis indicated that all isocyanate had reacted. A clear amber colored solution was obtained.

c. PAPI/EO800/2-BO (Ext-3)

Aromatic blocked isocyanate Ext-3 was prepared according to following procedure:

A reaction flask, equipped with a reflux condenser, a mechanical teflon blade stirrer, a thermometer, a nitrogen inlet and vacuo outlet, was charged with 36.72 g PAPI, 2.4 g E0800 and ethyl acetate (60%). The mixture was stirred until the reagents were dissolved. 25.58 g 2-BO and 2 drops DBTDL were added and the mixture was stirred at 75° C. during 4.5 hours after which FTIR analysis indicated that all isocyanate was reacted.

d. Desmodur N-100/EO750/2BO (Ext-7)

A reaction flask equipped with a reflux condenser, a mechanical stirrer, thermocouple and nitrogen inlet was charged with 95.5 g Desmodur™ N-100, 250 g ethyl acetate and 125 g MPEG 750. 0.25 g DBTDL was added and the resulting mixture was heated to 75° C. and stirred overnight. The mixture was then cooled to room temperature, and 29.1 g 2-BO was added dropwise with stirring. The mixture was reheated to 75° C. and stirred overnight. 750 g deionized water was slowly added, keeping the temperature between 65° C. and 75° C. during addition. The resulting mixture was homogenized using an ultrasonic homogenizer model CPX 600 (available from Cole-Parmer Instrument Co., Vernon Hills, Ill.) for five minutes. Ethyl acetate was removed by distillation under reduced pressure. A hazy solution was obtained.

B. Synthesis of Aromatic Polycarbodiimide MDI/Isofol 18T (Ext-4)

Aromatic polycarbodiimide Ext-4 was made according to the general procedure as given in U.S. Pat. No. 5,817,249.

A reaction flask, equipped with a reflux condenser, a mechanical teflon blade stirrer, a thermometer, a nitrogen inlet and vacuo outlet, was charged with 85.8 g Isofol 18T and 297.45 g MIBK (dry). 112.5 g MDI and 0.025 g DBTDL were added. The reaction mixture was stirred overnight at about 95° C. In a second step, 2.25 g camphene phenyl phosphine oxide (CPPO) catalyst was added (2% based on the amount of MDI). The reaction was run to completion at 110° C. during 8 hours. An amber colored solution was obtained.

C. Synthesis of Aliphatic Polycarbodiimide IPDI/ODI (Ext-5)

Aliphatic polycarbodiimide Ext-5 was made according to the following procedure:

A 250 ml 3 necked reaction flask, equipped with a thermometer, a nitrogen flow, a reflux condenser, a mechanical stirrer and a heating mantle was charged with 0.2 moles IPDI, 0.1 moles ODI and a camphene phenyl phosphine oxide (CPPO) catalyst (2% based on IPDI). The reaction mixture was gradually heated to 160° C. The reaction was run at 160° C. during 20 hours. FTIR analysis indicated that all isocyanate groups had reacted. A slightly hazy, brown, viscous mixture was obtained. 74 g ethyl acetate was added via a dropping funnel, while cooling the mixture. Another 37 g ethyl acetate was added to obtain a 40% solids solution.

D. Synthesis of Polymethyl Acrylate PMA (Ext-6)

A 500 ml reaction flask, equipped with a reflux condenser, a mechanical teflon blade stirrer, a thermometer, a nitrogen inlet and vacuo outlet, was charged with a solution of 2 g sodium dodecyl benzene sulfonate in 200 g water. 100 g methylacrylate was added while stirring. 0.2 g potassium persulfate and 0.2 g sodium bicarbonate, dissolved in 10 g water were added. The reaction mixture was heated to 60° C. under nitrogen flow. The reaction temperature was kept at 60° C. during 8 hours. A 32% solids emulsion was obtained.

TABLE 2

Composition of extenders

| Extender | Type | Composition | Molair ratio | % solids |
|---|---|---|---|---|
| Ext-1 | A | Mondur MR light/MPEG750/2-BO | 1/0.1/2.9 | 50 |
| Ext-2 | A | PAPI/glycerol monostearate/2-BO | 3/2/5 | 40 |
| Ext-3 | A | PAPI/EO800/2-BO | 1/0.03/2.94 | 30 |
| Ext-4 | B | MDI/Isofol 18T | 3/2 | 40 |
| Ext-5 | C | IPDI/ODI | 2/1 | 40 |
| Ext-6 | D | PMA | | 32 |
| Ext-7 | A | Desmodur N-100/EO750/2BO | 1/1/2 | 30 |

5. General Procedure for the Emulsification of the Extenders

Emulsification Ext-1

200 g of the ethyl acetate solution of Ext-I was added to 577 g deionised water while stirring in a stainless steel beaker. The setup was fitted with a Branson sonifier, which was run for 15 minutes.

The ethyl acetate was distilled off with a rotary evaporator at 60–65° C., using waterjet vacuum. The emulsion was filtered through cheesecloth and the final solids were measured at 14.1% by weight loss on drying.

Emulsification of Ext-2 to Ext-5

The extenders as prepared above were emulsified according to the following general procedure:

60 g of the extender solution (24 g solids) was heated to 65° C. and added to an aqueous solution of 1.2 g Ethoquad 18/25 and 58.8 g deionized water, preheated to 65° C., whilst stirring. The so formed pre-emulsion was then emulsified by immersion of an ultrasound probe (Branson 450-D Sonifier) for 2 minutes (cycle 10" run—5" stop at 50–60° C). The ethyl acetate was distilled off with a rotary evaporator at 55°, using waterjet vacuum. Stable milky emulsions of about 30% solids were obtained.

6. Performance Results

Examples 1 to 4

In examples 1 to 4, different substrates, as indicated in table 3 were treated with a homopolymer of PPVE-2 (FVEP-I 1), so as to obtain 1% SOF FVEP. After treatment the fabrics were dried at 160° C. during 1.5 minutes. The treated substrates were tested for their oil and water repellency. The results are summarized in table 3.

TABLE 3

Substrates treated with FVEP-11

| Ex No | Substrate | OR | WR | SR |
|---|---|---|---|---|
| 1 | PES/CO (2681.4) | 5 | 1 | 60 |
| 2 | PA$\mu$ (7819.4) | 6 | 1 | 70 |
| 3 | Co (1511.1) | 5 | W | 0 |
| 4 | PES$\mu$ (6145.3) | 3 | 1 | 80 |

The results indicated that fabric with very high oil repellency could be made when they were treated with a homopolymer of PPVE-2.

Examples 5 to 13 and Comparative Examples C-1 and C-2

In Examples 5 to 13 anionic emulsions of fluorochemical vinylether polymers, as given in table 4, were applied to 100% cotton US so as to give 1% SOF FVEP. After treatment the fabrics were dried at room temperature (air dry) or dried and cured at 150° C. for 10 minutes (150° C. cure). Comparative examples C-1 and C-2 was made with comparative fluorochemical polymers C-FC1 and C-FC2 respectively. The treated fabrics were tested for oil and water repellency. The results are given in table 4.

TABLE 4 performance on cotton, treated with perfluorovinylether copolymers

| | | Air dry | | 150° C. cure | |
|---|---|---|---|---|---|
| Ex no | FVEP | OR | SR | OR | SR |
| 5 | FVEP-1 | 0 | 0 | 0 | 80 |
| 6 | FVEP-2 | 0 | 0 | 0 | 90 |
| 7 | FVEP-3 | 0 | 0 | 1 | 85 |
| 8 | FVEP-4 | 1 | 50 | 1 | 80 |
| 9 | FVEP-5 | 2 | 0 | 3 | 85 |
| 10 | FVEP-6 | 4 | 50 | 4 | 80 |
| 11 | FVEP-7 | 5 | 60 | 5 | 70 |
| 12 | FVEP-8 | 4 | 70 | 5 | 95 |

TABLE 4-continued performance on cotton, treated with perfluorovinylether copolymers

| Ex no | FVEP | Air dry OR | Air dry SR | 150° C. cure OR | 150° C. cure SR |
|---|---|---|---|---|---|
| 13 | FVEP-9 | 3 | 50 | 5 | 95 |
| C-1 | C-FC1 | 0 | 0 | 0 | 0 |
| C-2 | C-FC2 | 0 | 0 | 0 | 0 |

As could be seen from the table 4, the treated fabrics had good oil and/or water repellency, in most cases even without the need for high temperature cure.

Examples 14 to 22 and Comparative Examples C-3 and C-4

In examples 14 to 22, and comparative examples C-3 and C-4 the same kind of experiment was repeated on a nylon (US) substrate. The results of oil and water repellency are given in table 5.

TABLE 5 performance on nylon, treated with perfluorovinylether polymer

| Ex no | FVEP | Air dry OR | Air dry SR | 120° C. Cure OR | 120° C. Cure SR |
|---|---|---|---|---|---|
| 14 | FVEP-1 | 0 | 50 | 0 | 50 |
| 15 | FVEP-2 | 0 | 60 | 0 | 75 |
| 16 | FVEP-3 | 0 | 60 | 0 | 70 |
| 17 | FVEP-4 | 0 | 70 | 1 | 70 |
| 18 | FVEP-5 | 0 | 50 | 1 | 70 |
| 19 | FVEP-6 | 0 | 70 | 3 | 75 |
| 20 | FVEP-7 | 0 | 50 | 5.5 | 80 |
| 21 | FVEP-8 | 1 | 50 | 5 | 95 |
| 22 | FVEP-9 | 0 | 50 | 4 | 80 |
| C-3 | C-FC1 | 0 | 60 | 0 | 70 |
| C-4 | C-FC2 | 0 | 70 | 0 | 50 |

The results of this experiment showed that good water repellency could be obtained on polyamide fabric. Heat cure was preferred in order to obtain also good oil repellency.

Examples 23 to 28

In examples 23 to 28 perfluorovinylether copolymer FVEP-7 and FVEP-9 in MEK were used to treat PES/CO, PA$\mu$ and cotton fabrics, so as to give 1% SOF. After treatment the fabrics were dried at room temperature (air cure) or dried and cured at 160° C. for 1.5 minutes. The treated fabrics were tested for oil and water repellency. The results are given in table 6.

TABLE 6

Performance results on PES/CO, PA$\mu$ and cotton treated with[3] Fluorochemical vinylether polymers

| Ex No | FVEP | Air dry OR | Air dry WR | Air dry SR | 160° C. cure OR | 160° C. cure WR | 160° C. cure SR |
|---|---|---|---|---|---|---|---|
| | | PES/CO (2681.4) | | | | | |
| 23 | FVEP-7 | 4 | 2 | 60W | 4 | 1 | 65 |
| 24 | FVEP-9 | 2 | 2 | 50 | 1 | 2 | 65 |

TABLE 6-continued

Performance results on PES/CO, PA$\mu$ and cotton treated with[3] Fluorochemical vinylether polymers

| Ex No | FVEP | Air dry OR | Air dry WR | Air dry SR | 160° C. cure OR | 160° C. cure WR | 160° C. cure SR |
|---|---|---|---|---|---|---|---|
| | | PA$\mu$ (7919.4) | | | | | |
| 25 | FVEP-7 | 3 | 3 | 70 | 5 | 5 | 70 |
| 26 | FVEP-9 | 2 | 2 | 60 | 1 | 2 | 70 |
| | | Cotton (1511.1) | | | | | |
| 27 | FVEP-7 | 3 | 1 | 50W | 4 | 1 | 60W |
| 28 | FVEP-9 | 2 | 2 | 60W | 1 | 1 | 0 |

The results indicated that in most cases treated substrates with high water and oil repellency were obtained, without the need for high temperature cure.

Examples 29 to 32

In examples 29 and 31 fluorochemical vinylether polymer FVEP-9 anionic emulsion was used to treat 100% cotton fabric and PAR, so as to give 1% SOF. Examples 30 and 32 were made by treating the same substrates with a blend of FVEP-9 (1% SOF) and extender Ext-5 (0.4% SOF). After treatment the fabrics were dried and cured at 160° C. for 1.5 minutes. The treated fabrics were tested for oil and water repellency, initially and also after 5 home launderings. The results are given in table 7.

TABLE 7

Performance results of cotton and PA$\mu$ treated with FVEP-9 and extender

| Ex no | FVEP | Initial OR | Initial SR | 5 HL OR | 5 HL SR |
|---|---|---|---|---|---|
| | | Cotton (1511.1) | | | |
| 29 | FVEP-9 | 4 | 50 | 0 | 0 |
| 30 | FVEP-9 + Ext-5 | 4 | 90 | 2 | 60 |
| | | PA$\mu$ (7819.4) | | | |
| 31 | FVEP-9 | 4.5 | 85 | 0 | 0 |
| 32 | FVEP-9 + Ext-5 | 4.5 | 100 | 2 | 75 |

From the results, it could be seen that both oil and water repellency could be increased when substrates were treated with a blend of fluorochemical vinylether polymer and an aliphatic polycarbodiimide extender. Especially the durability of the treatment could be increased, as indicated in high oil and water repellency after 5HL.

Examples 33 to 38

In examples 35 to 38 anionic emulsions of fluorochemical vinylether polymers and blends thereof with extender Ext-1 were evaluated. 100% cotton fabric was treated with the fluorochemical compounds (1% SOF) or with the blends of FVEP (1%) and extender (1%) as indicated in table 8. After treatment the fabrics were dried at room temperature and cured at 150° C. during 10 min. The treated fabrics were tested for oil and water repellency, initially and after home launderings. The results are given in table 8.

TABLE 8

Performance of cotton fabric, treated with fluorochemical vinylether polymers and extender Ext-1

| | | % SOF | Initial | | 5 HL | | 15 HL | |
|---|---|---|---|---|---|---|---|---|
| Ex no | 1% FVEP | Ext-1 | OR | SR | OR | SR | OR | SR |
| 33 | FVEP-7 | 0 | 5 | 75 | 0 | 0 | 0 | 0 |
| 34 | FVEP-7 | 1 | 5 | 75 | 5 | 70 | 5 | 70 |
| 35 | FVEP-8 | 0 | 5 | 50 | 0 | 0 | 0 | 0 |
| 36 | FVEP-8 | 1 | 3.5 | 70 | 3.5 | 60 | 2 | 60 |
| 37 | FVEP-9 | 0 | 5 | 85 | 0 | 0 | 0 | 0 |
| 38 | FVEP-9 | 1 | 5 | 85 | 4 | 70 | 2.5 | 70 |

Although initially high oil and water repellency was obtained for all treated samples, the durability of the treatment could be increased by using a blend of fluorochemical vinylether polymer and a blocked isocyanate extender.

Examples 39 to 66

In examples 39 to 66 different substrates were treated with an anionic emulsion of fluorochemical vinylether polymer FVEP-10 in combination with extenders, so as to give 1% SOF FVEP-10 and 0.4% SOF extender. After treatment the fabrics were dried for 1.5 minutes at 160° C. and tested for oil and water repellency. The results are summarized in tables 9 to 12.

TABLE 9

Performance of Cotton fabric (1511.1), treated with 1% SOF FVEP-10 and 0.4% SOF of various extenders

| Ex no | EXTENDER | OR | WR | SR |
|---|---|---|---|---|
| 39 | — | 3 | 0 | 0 |
| 40 | Hydrophobol ™ XAN | 3.5 | 1.5 | 70 |
| 41 | Tubicoat ™ ICB | 3 | 1.5 | 70 |
| 42 | Ext-2 | 3 | 1 | 70 |
| 43 | Ext-3 | 3 | 3 | 80 |
| 44 | Ext-4 | 3 | 1 | 70 |
| 45 | Ext-5 | 3 | 2 | 50 |

TABLE 10

Performance of PES/Cotton fabric (2861.4), treated with 1% SOF FVEP-10 and 0.4% SOF of various extenders

| Ex no | EXTENDER | OR | WR | SR |
|---|---|---|---|---|
| 46 | — | 3 | 0 | 0 |
| 47 | Hydrophobol ™ XAN | 4 | 1.5 | 50w |
| 48 | Tubicoat ™ ICB | 4 | 1.5 | 50w |
| 49 | Ext-2 | 3 | 1 | 70 |
| 50 | Ext-3 | 3 | 2 | 80 |
| 51 | Ext-4 | 3 | 2 | 70 |
| 52 | Ext-5 | 3 | 2 | 50 |

TABLE 11

Performance of PA$\mu$ fabric (7819.4), treated with 1% SOF FVEP-10 and 0.4% SOF of various extenders

| Ex no | EXTENDER | OR | WR | SR |
|---|---|---|---|---|
| 53 | — | 3 | 0 | 50 |
| 54 | Hydrophobol ™ XAN | 3.5 | 2.5 | 70 |
| 55 | Tubicoat ™ ICB | 3.5 | 1.5 | 70 |
| 56 | Ext-2 | 3.5 | 2 | 70 |

TABLE 11-continued

Performance of PA$\mu$ fabric (7819.4), treated with 1% SOF FVEP-10 and 0.4% SOF of various extenders

| Ex no | EXTENDER | OR | WR | SR |
|---|---|---|---|---|
| 57 | Ext-3 | 3 | 2 | 75 |
| 58 | Ext-4 | 3.5 | 2.5 | 75 |
| 59 | Ext-5 | 2.5 | 2.5 | 70 |

TABLE 12

Performance of PES$\mu$ fabric (6145.3), treated with 1% SOF FVEP-11 and 0.4% SOF of various extenders

| Ex no | EXTENDER | OR | WR | SR |
|---|---|---|---|---|
| 60 | — | 1.5 | 1 | 70 |
| 61 | Hydrophobol ™ XAN | 2 | 1 | 75 |
| 62 | Tubicoat ™ ICB | 2.5 | 1 | 70 |
| 63 | Ext-2 | 2.5 | 1 | 70 |
| 64 | Ext-3 | 2 | 1 | 75 |
| 65 | Ext-4 | 1.5 | 2 | 80 |
| 66 | Ext-5 | 2 | 2 | 80 |

The results indicated that both oil and water repellency could be increased by using a blend of fluorochemical vinylether polymer and extender.

Example 67

In example 67, the same kind of experiment was repeated with an anionic emulsion of FVEP-9. Cotton and polyamide microfiber were treated with a blend of fluorochemical vinylether FVEP-9 and Hydrophobol XAN, to which was added 2.5% Ethoquad™ 18/25, to increase the bath stability. The treatment was applied so as to give 1% SOF FVEP-9 and 0.4% SOF Hydrophobol XAN. After treatment the fabrics were dried for 1.5 minutes at 160° C. and tested for oil and water repellency. The results are summarized in table 13.

TABLE 13

Cotton and PA$\mu$ fiber treated with a blend of FVEP-9 and Hydrophobol ™ XAN

| | Cotton | | | PA$\mu$ | | |
|---|---|---|---|---|---|---|
| Ex No | OR | WR | SR | OR | WR | SR |
| 67 | 2 | 3 | 85 | 3.5 | 3.5 | 80 |

Examples 68

In example 68, an anionic emulsion of FVEP-7 was coagulated using MgCl. The solids were dissolved in ethyl acetate and postemulsified with a 3% solution of Arquad 12–50 according to the general procedure.

The emulsion was used to treat cotton (US) and polyamide (US) fabrics. The treated fabrics were tested for oil repellency after air dry and after drying and curing at 150° C. during 10 min. The results are given in table 14.

TABLE 14

Cotton and PAµ fiber treated with FVEP-7

| | Oil repellency Cotton (US) | | Oil repellency PAµ fiber (US) | |
|---|---|---|---|---|
| Ex No | Air dry | 150° C. Cure | Air dry | 150° C. Cure |
| 68 | 2 | 2 | 2 | 2 |

The results in the table indicate that also good oil repellency could be obtained with cationic emulsions. Furthermore, high oil repellency was observed without the need for a heat cure after treatment.

Examples 69 to 72

In examples 69 to 72, 100% cotton fabric (US) was treated with the fluorochemical vinylether polymers, given in table 15, so as to give 1% SOF FVEP. After treatment the fabrics were dried and cured at 150° C. for 10 minutes. The treated fabrics were tested for oil and water repellency, initially and after 5 home launderings. The results are given in table 15.

TABLE 15

Cotton fabric treated with fluorochemical vinylether polymers

| | | Initial | | 5 HL | |
|---|---|---|---|---|---|
| Ex no | 1% SOF FVEP | OR | SR | OR | SR |
| 69 | FVEP-13 | 4 | 70 | 4 | 0 |
| 70 | FVEP-14 | 4 | 70 | 3 | 0 |
| 71 | FVEP-15 | 4 | 60 | 4 | 0 |
| 72 | FVEP-16 | 4 | 70 | 3 | 0 |

The results indicated that the treated substrates had very high oil repellency, not only initially, but also after repeated home launderings, indicating that a high durable treatment was obtained.

Examples 73 to 80

In examples 73 to 80, 100% cotton fabric was treated with blends of fluorochemical vinylether polymers, as given in table 16, with extender Ext-1, so as to give 0.875% SOF FVEP and % SOF Ext-1 as given in table 16. After treatment the fabrics were dried and cured at 150° C. for 10 minutes. The treated fabrics were tested for oil and water repellency, initially and also after several home launderings. The results are given in table 16.

TABLE 16

100% cotton fabric treated with a blend of fluorochemical vinylether polymers and extender

| Ex | | % SOF | Initial | | 5 HL | | 20 HL | |
|---|---|---|---|---|---|---|---|---|
| no | FVEP | Ext-1 | OR | SR | OR | SR | OR | SR |
| 73 | FVEP-13 | 0.25 | 4 | 75 | 4 | 75 | 3 | 50 |
| 74 | FVEP-13 | 0.875 | 4 | 75 | 4 | 75 | 3 | 50 |
| 75 | FVEP-14 | 0.25 | 4 | 75 | 4 | 70 | 3 | 60 |
| 76 | FVEP-14 | 0.875 | 4 | 75 | 4 | 70 | 3 | 60 |
| 77 | FVEP-15 | 0.25 | 4 | 75 | 4 | 75 | 3 | 50 |
| 78 | FVEP-15 | 0.875 | 4 | 75 | 4 | 75 | 3 | 50 |
| 79 | FVEP-16 | 0.25 | 4 | 75 | 3 | 75 | 2 | 50 |
| 80 | FVEP-16 | 0.875 | 3 | 75 | 3 | 75 | 2 | 50 |

The results in the table indicate that very high durable oil and water repellent treatments could be made with the blends of fluorochemical vinylether polymers and blocked isocynate extender. The oil and water repellency remained very high, even after 20 home launderings.

Examples 81 to 83

In examples 81 to 83, cotton fabric (US) was treated with FVEP-17 at 1% SOF, alone or in combination with Ext-6 so as to give SOF as indicated in table 17. After treatment, the fabrics were dried and cured at 150° C. during 10 minutes. The treated fabrics were tested for oil and water repellency, initially and after home launderings. The results are given in table 17.

TABLE 17

100% cotton fabric treated with a blend of fluorochemical vinylether polymer and extender

| Ex | % SOF | Initial | | 5 HL | | 10 HL | 15 HL |
|---|---|---|---|---|---|---|---|
| no | Ext-6 | OR | SR | OR | SR | OR | OR |
| 81 | 0 | 4 | 70 | 0 | 0 | | |
| 82 | 0.5 | 4 | 70 | 3 | 0 | 2 | 2 |
| 83 | 1 | 4 | 70 | 2.5 | 0 | 2 | 2 |

The data indicated that the durability of the treatment with respect to oil repellency could be increased by using a blend of fluorochemical vinylether polymer with a polymethylacrylate. Oil repellency remained high, even after repeated launderings.

Example 84

In example 84, an anionic emulsion of fluorochemical vinylether polymer FVEP-6 was pad applied to polypropylene SMS nonwoven fabric so as to give 1% SOF. 1% alcohol (e.g., n-butanol) was added to the emulsion and mixed in with a high speed stirrer to facilitate the wetting of the low surface energy polypropylene fabric. After treatment, the wet nonwoven fabric was dried by placing the fabric in a 46 cm×51 cm sheet dryer (available from Williams Apparatus Co., Watertown, N.Y.) set at a temperature of 127±3° C. with the fabric face side down (i.e., face side in contact with metal and reverse side in contact with canvas) and drying/curing for 2.5 minutes, followed by turning over the fabric and curing in reverse for 0.5 minutes at the same temperature. The treated nonwoven fabric gave an oil repellency of 1.

This indicated that oil repellency could be imparted to the normally oleophilic polypropylene SMS nonwoven fabrics by treating with a fluorochemical vinylether polymer.

Examples 85 to 88

In examples 85 to 88, anionic emulsions of fluorochemical vinylether polymers, as shown in table 18, were pad applied to cellulose/polyester nonwoven fabrics so as to give from 0.5 to 1.0% SOF FVEP. After treatment, the wet nonwoven fabrics were dried by placing each fabric in the 46 cm×51 cm Williams sheet dryer set at a temperature of 127±3° C. with the fabric face side down (i.e., face side in contact with metal and reverse side in contact with canvas) and drying/curing for 2.5 minutes, followed by turning over the fabric and curing in reverse for 0.5 minutes at the same temperature. The treated nonwoven fabrics were then tested for oil and water repellency. The results are given in table 18.

TABLE 18

Performance of cellulose/polyester nonwoven fabric, treated with fluorochemical vinylether polymers

| Ex no | FVEP | % SOF | OR | WR |
|---|---|---|---|---|
| 85 | FVEP-5 | 0.66 | 5 | 5 |
| 86 | FVEP-6 | 0.66 | 5 | 4 |
| 87 | FVEP-7 | 0.5 | 5 | 0 |
| 88 | FVEP-7 | 1.0 | 6 | 0 |

The results indicated that very high oil repellency (at least 5) could be obtained with all the fluorochemical vinylether polymers tested, while water repellency was dependent on the particular polymer tested.

Examples 89 to 92

In examples 89 to 92, cotton fabric (US) and nylon fabric were treated with a hexafluorometaxylene solution of FVEP-11 (made with Nafion 5E10172 emulsifier), alone or in combination with THV-220 so as to give % SOF as indicated in table 19. After treatment, the fabrics were dried and cured at 150° C. during 10 minutes. The treated fabrics were tested for oil and water repellency. The results are given in table 19.

TABLE 19 cotton and nylon fabric treated with a blend of fluorochemical vinylether polymer and THV-220

| Ex no | % SOF FVEP-11 | % SOF THV-220 | Initial oil Cotton | Initial oil Nylon | Initial SR Cotton | Initial SR Nylon |
|---|---|---|---|---|---|---|
| 89 | 0.1 | 0 | 2 | 2 | 0 | 70 |
| 90 | 0.1 | 0.9 | 4 | 4 | 50 | 70 |
| 91 | 0.2 | 0 | 4 | 4 | 0 | 75 |
| 92 | 0.2 | 0.8 | 5 | 5 | 50 | 75 |

The results in table 19 show a substantial improvement in both oil and water repellency if a mixture of the fluorochemical vinylether polymer with a fluoropolymer that does not contain a repeating unit according to general formula (I) was used. Such fluoropolymers did not provide oil- and/or water repellency properties to a fibrous substrate when used on their own as is shown by the comparative examples C-1 to C-4 above. It is thus surprising to note that in combination with a fluoropolymer according to the invention, they are capable of improving the repellency properties of a fibrous substrate.

Examples 93 to 94

In examples 93 to 94, cotton fabrics were treated with an aqueous emulsion of FVEP-1 I (made with Nafion SE10172 emulsifier), alone or in combination with THV-220 so as to give % SOF as indicated in table 20. After treatment, the fabrics were dried and cured at 150° C. during 10 minutes. The treated fabrics were tested for oil and water repellency. The results are given in table 20.

TABLE 20 cotton fabric treated with a blend of fluorochemical vinylether polymer and THV-220

| Ex no | % SOF FVEP-11 | % SOF THV-220 | Initial oil Cotton US | Initial oil Cotton US-3 | Initial SR Cotton US | Initial SR Cotton US-3 |
|---|---|---|---|---|---|---|
| 93 | 0.1 | 0 | 2.5 | 2 | 0 | 0 |
| 94 | 0.1 | 0.4 | 5 | 5 | 50 | 75 |
| 93 | 0.2 | 0 | 4 | 5 | 0 | 50 |
| 94 | 0.2 | 0.8 | 6 | 6 | 75 | 70 |

The results in table 20 indicate that also for water based applications, an improvement in both oil and water repellency could be noticed if a mixture of the fluoropolymer according to the invention and a fluoropolymer not having the repeating units of general formula (I) was used to treat cotton fabrics.

Examples 95 to 108

In examples 95 to 108 shown in Tables 21 and 22, 65/35 PES/CO-2 and 100% cotton US-2 fabrics were treated with fluorochemical vinylether polymers to give 0.6% SOF polymer. After the treatment, the fabrics were dried and cured at 150° C. for 10 minutes. The treated fabrics were tested for oil repellency and stain release, initially and also after 5 home launderings. The results on 65/35 PES/CO-2 fabric are given in Table 21; the results on 100% cotton US-2 fabric are given in Table 22.

TABLE 21

Stain release of 65/35 PES/CO-2 fabric treated with fluorochemical vinylether polymers, initially and after 5 launderings

| | | Initial | | | 5 Launderings | | |
|---|---|---|---|---|---|---|---|
| Ex no | FVEP | OR | Stain K | Stain E | OR | Stain K | Stain E |
| 95 | FVEP-6 | 3 | 7.5 | 7 | 2 | 7 | 7.5 |
| 96 | FVEP-8 | 5 | 7.5 | 7.5 | 0 | 7 | 7.5 |
| 97 | FVEP-9 | 5 | 7.5 | 7 | 0 | 6.5 | 6.5 |
| 98 | FVEP-7 (cationic) | 1 | 7.5 | 7.5 | 0.5 | 7.5 | 7 |
| 99 | FVEP-12 | 4 | 7 | 6.5 | 1 | 7.5 | 7.5 |
| 100 | FVEP-13 | 4 | 7 | 6.5 | 3 | 7.5 | 7 |
| 101 | FVEP-14 | 4 | 7.5 | 7 | 3 | 7 | 7 |
| 102 | FVEP-15 | 5 | 7 | 7.5 | 4 | 7 | 6.5 |
| 103 | FVEP-16 | 4 | 7.5 | 7 | 3 | 6.5 | 6 |
| 104 | FVEP-18 | 4 | 7.5 | 7 | 1 | 7 | 7 |
| 105 | FVEP-19 | 4.5 | 7.5 | 7 | 4 | 7 | 6.5 |

TABLE 22

Stain release of 100% cotton US-2 fabric treated with fluorochemical vinylether polymers, initially and after 5 launderings

| | | Initial | | | 5 Launderings | | |
|---|---|---|---|---|---|---|---|
| Ex no | FVEP | OR | Stain K | Stain E | OR | Stain K | Stain E |
| 106 | FVEP-20 | 3 | 8 | 7 | 1 | 6 | 6.5 |
| 107 | FVEP-21 | 3 | 7 | 6.5 | 0 | 6.5 | 7 |
| 108 | FVEP-22 | 4 | 7.5 | 8 | 1 | 6.5 | 6.5 |

The results in tables 21 and 22 indicate that very good oil repellency and stain release treatments could be achieved by employing the fluorochemical vinylether polymers. Performance was still present after 5 home launderings.

Examples 109 to 112

In examples 109 and 111 (shown in Table 23), 65/35 PES/CO-2 fabric samples were treated with various fluorochemical vinylether polymers so as to give 0.6% SOF. In examples 110 and 112 (also shown in Table 23), the same treating procedure was followed, except that 1.5% SOF Ext-7 was co-applied along with 0.6% SOF FVEP to each fabric sample. All of the above-mentioned treating compositions additionally contained by weight: 10% glyoxal-type permanent press resin (Permafresh™ ULF, available from Omnova Solutions, Chester, S.C.) to give 1.6% SOF, 2.5% buffered magnesium salt catalyst (Freecat™ MX, available from B. F. Goodrich, Cleveland, Ohio) to give 0.4% SOF, 0.1% nonionic surfactant (Pat-Wet™ LF-55, available from Yorkshire Pat-Chem Inc., Greenville, S.C.) to give 0.05% SOF, and 0.01–0.05% of Ethoquad™ 18/25 to give 0.006–0.03% SOF. After treatment, the fabric samples were dried and cured at 150° C. for 10 minutes. The treated fabrics were tested for oil repellency and stain release, initially and also after as many as 20 home launderings. Results are given in Table 23.

TABLE 23

Stain release and oil repellency of 65/35 PES-CO-2 fabric treated with a blend of fluorochemical vinyl ether polymer and extender, initially and after 10 and 20 launderings

| | | | Initial | | | 20 HL | | |
|---|---|---|---|---|---|---|---|---|
| Ex no. | FVEP | Ext-7 (Y/N) | OR | Stain K | Stain E | 10 HL OR | OR | Stain K | Stain E |
| 109 | FVEP-7 | N | 6 | 6.5 | 7 | 1 | 0 | 6 | 6 |
| 110 | FVEP-7 | Y | 6 | 7.5 | 8 | 1 | 0 | 7.5 | 7.5 |
| 111 | FVEP-23 | N | 4 | 6.5 | 6 | 1 | 0 | 6 | 6 |
| 112 | FVEP-23 | Y | 4 | 7.5 | 8 | 2 | 1 | 7.5 | 7.5 |

The results in Table 23 show that fabrics treated with fluorochemical vinylether compositions had good stain release and/or oil repellency. Addition of a polyoxyethylene-containing blocked isocyanate extender to the fluorochemical composition further improved the stain release and/or oil repellency. This overall performance improvement continued even after 20 launderings.

Examples 115 to 126

In examples 115 to 126, different substrates were treated with fluorochemical vinylether polymers FVEP-18 and FVEP-19 at a concentration as indicated in tables 24 to 26. After treatment, the fabrics were dried (air dry) or dried and cured at 150° C. during 10 min (initial). The treated fabrics were tested for oil and water repellency, initially and also after 5 home launderings. The results on 100% cotton US fabric are given in table 24; the results on 100% cotton US-3 fabric are given in table 25 and the results on nylon US are given in table 26.

TABLE 24

Oil and water repellency of 100% cotton US treated with fluorochemical vinylether polymers, initially and after 5 launderings.

| Ex | | Air dry | | Initial | | 5 HL | |
|---|---|---|---|---|---|---|---|
| No | SOF FVEP | OR | SR | OR | SR | OR | SR |
| 115 | 0.5% FVEP-18 | 2 | 0 | 1 | 0 | 0 | 0 |
| 116 | 1% FVEP-18 | 2 | 0 | 4 | 75 | 2 | 0 |
| 117 | 0.5% FVEP-19 | 3 | 0 | 3 | 70 | 2 | 0 |
| 118 | 1% FVEP-19 | 4 | 50 | 4 | 70 | 4 | 0 |

TABLE 25

Oil and water repellency of 100% cotton US-3 treated with fluorochemical vinylether polymers, initially and after 5 launderings.

| Ex | | Air dry | | Initial | | 5 HL | |
|---|---|---|---|---|---|---|---|
| No | SOF FVEP | OR | SR | OR | SR | OR | SR |
| 119 | 0.5% FVEP-18 | 2 | 50 | 1 | 70 | 0 | 0 |
| 120 | 1% FVEP-18 | 3 | 70 | 3 | 50 | 0 | 0 |
| 121 | 0.5% FVEP-19 | 2 | 50 | 3 | 70 | 2 | 0 |
| 122 | 1% FVEP-19 | 3 | 60 | 4 | 70 | 3 | 0 |

TABLE 26

Oil and water repellency of 100% nylon US treated with fluorochemical vinylether polymers, initially and after 5 launderings.

| Ex | | Air dry | | Initial | | 5 HL | |
|---|---|---|---|---|---|---|---|
| No | SOF FVEP | OR | SR | OR | SR | OR | SR |
| 123 | 0.5% FVEP-18 | 0 | 70 | 2 | 75 | 0 | 0 |
| 124 | 1% FVEP-18 | 2 | 70 | 3 | 75 | 2 | 70 |
| 125 | 0.5% FVEP-19 | 1 | 60 | 3 | 75 | 2 | 60 |
| 126 | 1% FVEP-19 | 2 | 70 | 4 | 75 | 3 | 60 |

The results in tables 24 to 26 indicate that good oil and water repellency could be achieved by employing the fluorochemical vinylether polymers. Performance was still present after 5 home launderings, especially at the higher add-on levels.

Examples 127 to 130

In examples 127 to 130 different substrates, as given in table 27, were treated with FVEP-24 so as to give 0.5% SOF. The samples were dried and cured at 160° C. during 1.5 minutes. The treated fabrics were evaluated for their oil and water repellency. The results are given in table 27.

TABLE 27 substrates treated with PPVE1 homopolymer

| Ex No | Substrate | OR | WR | SR |
|---|---|---|---|---|
| 127 | Co (1511.1) | 4 | 3.5 | 70 |
| 128 | PAµ (7819.4) | 3.5 | 1.5 | 100 |
| 129 | PES/Co (2681.4) | 3.5 | 1 | 0 |
| 130 | PESµ (6145.3) | 2 | 2 | 90 |

As can be seen from the results, substrates treated with PPVE1 homopolymer had good water and/or oil repellency properties.

Comparative Examples C-5 to C-8

In comparative examples C-5 and C-7, 65/35 PES—CO-2 fabric was treated at 0.6% SOF with C-FC3 and C-FC4, comparative hexafluoropropylene/vinylidene fluoride fluoropolymers containing no repeating units of formula (I) above. In comparative examples C-6 and C-8, 65/35 PES—CO-2 fabric was treated with 0.6% SOF of each respective comparative copolymer and 1.5% SOF of Ext-7. After treatment, each treated fabric was dried and cured at 150° C. for 10 minutes, then was tested for oil repellency and stain resistance—initially and also after as many as 20 home launderings. Results are given in table 28.

TABLE 28

Stain release and oil repellency of 65/35 PES-CO-2 fabric treated with comparative fluoropolymers with and without extender, initially and after 10 and 20 launderings

| Ex no. | Comp. Fluoropolymer | Ext-7 (Y/N) | Initial OR | Stain K | Stain E | 10 HL OR | 20 HL OR | Stain K | Stain E |
|---|---|---|---|---|---|---|---|---|---|
| C-5 | C-FC3 | N | 0 | 6 | 5.5 | 0 | 0 | 5.5 | 6 |
| C-6 | C-FC3 | Y | 0 | 6.5 | 6 | 0 | 0 | 5.5 | 6 |
| C-7 | C-FC4 | N | 0 | 6 | 5.5 | 0 | 0 | 6 | 6.5 |
| C-8 | C-FC4 | Y | 0 | 6.5 | 6.5 | 0 | 0 | 6 | 6.5 |

The results in table 28 show each fluoropolymer, used alone or with the extender, imparted poor oil repellency to the treated fabric. Also, the comparative fluoropolymers imparted poorer stain release performance to the treated fabric than did the fluorochemical vinyl ethers of this invention, both with and without the extender (compare to table 23 above).

What is claimed is:

1. Method for treating a fibrous substrate comprising contacting the fibrous substrate with a fluorochemical composition comprising a solution or dispersion of up to 4% by weight of a fluoropolymer having a partially or fully fluorinated backbone and comprising one or more repeating units corresponding to the general formula:

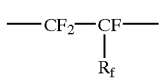
(I)

wherein $R_f$ represents a perfluorinated organic group having a chain length of at least 2 atoms and having at least one carbon atom.

2. Method according to claim 1 wherein $R_f$ represents a perfluorinated aliphatic group optionally containing one or more oxygen atoms.

3. Method according to claim 1 wherein $R_f$ is a perfluoroalkoxy group, a perfluoroalkyl group or a perfluoropolyether group.

4. Method according to claim 1 wherein $R_f$ corresponds to the following formula:

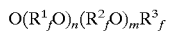

wherein $R^1_f$, $R^2_f$ each independently represents a linear or branched perfluoroalkylene having 1, 2, 3, 4, 5 or 6 carbon atoms, $R^3_f$ represents a linear, branched or cyclic perfluoroalkyl group having 1,2,3,4,5 or 6 carbon atoms and n and m each independently represents an integer of 0 to 10.

5. Method according to claim 4 wherein n is 0, m is 1, $R^2_f$ is a perfluoroalkylene having 2 or 3 carbon atoms and $R^3_f$ is perfluoropropyl.

6. Method according to claim 1 wherein the backbone of said fluoropolymer is at least 10% by weight fluorinated.

7. Method according to claim 1 wherein said one or more repeating units according to formula (I) are present in said fluoropolymer in a total amount of at least 1 mole %.

8. Method according to claim 7 wherein the total amount of said one or more repeating units according to formula (I) is at least 10 mole %.

9. Method according to claim 1 wherein said fluoropolymer is a copolymer of at least one fluorinated monomer selected from the group consisting of tetrafluoroethylene, vinylidene fluoride and trichlorofluoroethylene and a monomer corresponding to the formula:

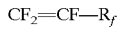

wherein $R_f$ has the meaning as defined in claim 7.

10. Method according to claim 9 wherein the amount of repeating units derived from tetrafluoroethylene is between 0 mole % and 70 mole %, the amount of repeating units derived from vinylidene fluoride is between 0 and 95 mole % and the total amount of repeating units derived from tetrafluoroethylene and vinylidene fluoride is between 95 mole % and 0 mole %.

11. Method according to claim 9 wherein said fluoropolymer further comprises repeating units derived from further fluorinated monomers and/or non-fluorinated monomers.

12. Method according to claim 11 wherein said further fluorinated monomers include hexafluoropropylene and wherein said non-fluorinated monomers include ethylene and propylene.

13. Method according to claim 1 wherein said composition is an aqueous dispersion of said fluoropolymer.

14. Method according to claim 13 wherein said aqueous dispersion is non-ionic, anionic, cationic or zwitterionic.

15. Method according to claim 1 wherein said composition is a dispersion of said fluoropolymer in an organic solvent.

16. Method according to claim 13 wherein the average particle size of said fluoropolymer is less than 300 nm.

17. Method according to claim 1 wherein said fluorochemical composition further comprises one or more auxiliary components capable of further improving the oil- and/or water repellency of a fibrous substrate treated with the fluorochemical composition or an auxiliary component that is capable of providing improved soil/stain release properties to the fibrous substrate.

18. Method according to claim 17 wherein said one or more auxiliary components comprise aliphatic polyisocyanates, blocked isocyanates, aliphatic or aromatic carbodiimides, or homo- or copolymers of alkyl esters of acrylic or methacrylic acid.

19. Method according to claim 1 wherein the amount of said fluoropolymer is between 0.05% by weight and 3% by weight.

20. Method according to claim 1 wherein the fluorochemical composition is applied to the fibrous substrate in an amount such that the resulting amount of said fluoropolymer on said fibrous substrate is not more than 3% by weight based on the weight of said fibrous substrate.

21. Method according to claim 1 wherein said fibrous substrate is textile.

22. Method according to claim 4 wherein subsequent to contacting said fibrous substrate with said fluorochemical composition, said fibrous substrate is subjected to a heat treatment between 90° C. and 170° C. for a time of 10 minutes to 20 seconds.

23. Method according to claim 1 wherein said first fluoropolymer comprises only repeating units according to said general formula (I).

24. Use of a fluorochemical composition to impart oil repellency, water repellency, soil repellency and/or soil/stain release to a fibrous substrate without substantially affecting the look and feel of said fibrous substrate, the fluorochemical composition comprising a solution or dispersion of a fluoropolymer having a partially or fully fluorinated backbone and comprising one or more repeating units corresponding to the general formula:

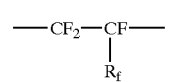

(I)

wherein $R_f$ represents a perfluorinated organic group having a chain length of at least 2 atoms and having at least one carbon atom.

* * * * *

UNITED STATES PATENT AND TRADEMARK OFFICE
CERTIFICATE OF CORRECTION

PATENT NO. : 6,737,489 B2
DATED : May 18, 2004
INVENTOR(S) : Audenaert, Frans A.

It is certified that error appears in the above-identified patent and that said Letters Patent is hereby corrected as shown below:

Column 5,
Line 23, delete "perfluoralkoxy" and insert -- perfluoroalkoxy --, therefor.

Column 9,
Line 6, delete "$(CF(CF_3 O)CF_2O)_q$" and insert - - $(CF(CF_3)CF_2O)_q$ --, therefor.
Line 44, delete "$(CH_2)$, OH" and insert - - $(CH_2)_nOH$ --, therefor.
Line 51, delete "tetaarylammonium" and insert -- tetraarylammonium --, therefor.
Line 62, delete "IE10172" and insert -- SE10172 --, therefor.

Column 14,
Line 1, delete "zwitter ionic" and insert -- zwitterionic --, therefor.

Column 18,
Line 51, delete "4 +- 5" and insert -- 45 +- 5 --, therefor.

Column 21,
Line 26, delete "111 °C° C" and insert -- 111 °C --, therefor.
Line 27, delete "5.2 g/10" and insert -- 5.2 g/10' --, therefor.
Line 39, delete "710° C" and insert -- 71° C --, therefor.
Line 56, delete "84 Nm" and insert -- 84 nm --, therefor.
Line 64, delete "aMFI" and insert -- a MFI --, therefor.

Column 22,
Line 13, delete "Micofluidizer" and insert -- Microfluidizer --, therefor.

Column 24,
Line 66, delete "ratio's" and insert -- ratios --, therefor.

Column 25,
Line 38, delete "(~75hrs)" and insert -- (~1.75hrs) --, therefor.

Column 27,
Line 16, "A small" should start a new paragraph.

Column 29,
Line 62, delete "Ext-I" and insert -- Ext-1 --, therefor.

UNITED STATES PATENT AND TRADEMARK OFFICE
CERTIFICATE OF CORRECTION

PATENT NO. : 6,737,489 B2
DATED : May 18, 2004
INVENTOR(S) : Audenaert, Frans A.

It is certified that error appears in the above-identified patent and that said Letters Patent is hereby corrected as shown below:

Column 30,
Line 22, delete "(FVEP-I 1)" and insert -- (FVEP-11) --, therefor.

Column 32,
Line 26, delete "PAR" and insert -- PAμ, --, therefor.

Column 36,
Line 4, delete "isocynate" and insert -- isocyanate --, therefor.

Column 37,
Line 28, delete "5E10172" and insert -- SE10172 --, therefor.
Line 63, delete "(FVEP-II)" and insert -- (FVEP-11) --, therefor.

Signed and Sealed this

Twenty-first Day of December, 2004

JON W. DUDAS
*Director of the United States Patent and Trademark Office*